(12) United States Patent
Aparin

(10) Patent No.: US 8,942,314 B2
(45) Date of Patent: Jan. 27, 2015

(54) TRANSMIT (TX) INTERFERENCE CANCELLER AND POWER DETECTOR

(71) Applicant: QUALCOMM Incorporated, San Diego, CA (US)

(72) Inventor: Vladimir Aparin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 13/828,861

(22) Filed: Mar. 14, 2013

(65) Prior Publication Data

US 2014/0269991 A1    Sep. 18, 2014

(51) Int. Cl.
*H04K 1/02* (2006.01)
*H04B 1/04* (2006.01)

(52) U.S. Cl.
CPC .................................... *H04B 1/0475* (2013.01)
USPC ........... 375/297; 375/267; 375/373; 455/149; 455/24; 455/522

(58) Field of Classification Search
None
See application file for complete search history.

(56) References Cited

U.S. PATENT DOCUMENTS

| | | | |
|---|---|---|---|
| 7,711,329 B2 | 5/2010 | Aparin et al. | |
| 8,160,514 B2 | 4/2012 | Aparin et al. | |
| 2006/0105715 A1* | 5/2006 | Kodani et al. | 455/63.1 |
| 2008/0170651 A1* | 7/2008 | Moutard | 375/373 |
| 2010/0105320 A1* | 4/2010 | Seki | 455/24 |
| 2010/0142596 A1* | 6/2010 | Kang et al. | 375/149 |
| 2010/0203840 A1 | 8/2010 | Mouhouche | |
| 2010/0322346 A1 | 12/2010 | Aparin | |
| 2010/0323641 A1 | 12/2010 | Aparin et al. | |
| 2010/0327932 A1 | 12/2010 | Aparin et al. | |
| 2011/0021237 A1* | 1/2011 | He et al. | 455/522 |
| 2011/0069774 A1* | 3/2011 | Wang et al. | 375/267 |
| 2011/0216810 A1 | 9/2011 | Kumar | |
| 2011/0234315 A1 | 9/2011 | Chen et al. | |
| 2012/0149306 A1 | 6/2012 | Gebara et al. | |
| 2012/0295561 A1* | 11/2012 | Shen et al. | 455/114.3 |

* cited by examiner

*Primary Examiner* — Leon-Viet Nguyen
(74) *Attorney, Agent, or Firm* — Fountainhead Law Group P.C.

(57) ABSTRACT

A method for Tx interference cancellation and power detection in a wireless device is described. A portion of a Tx output signal is down-converted to generate a feedback signal. A reconstructed interference signal and a weight are generated based on the feedback signal. A Tx power level is detected based on the weight. The reconstructed interference signal is subtracted from the Tx output signal.

47 Claims, 10 Drawing Sheets

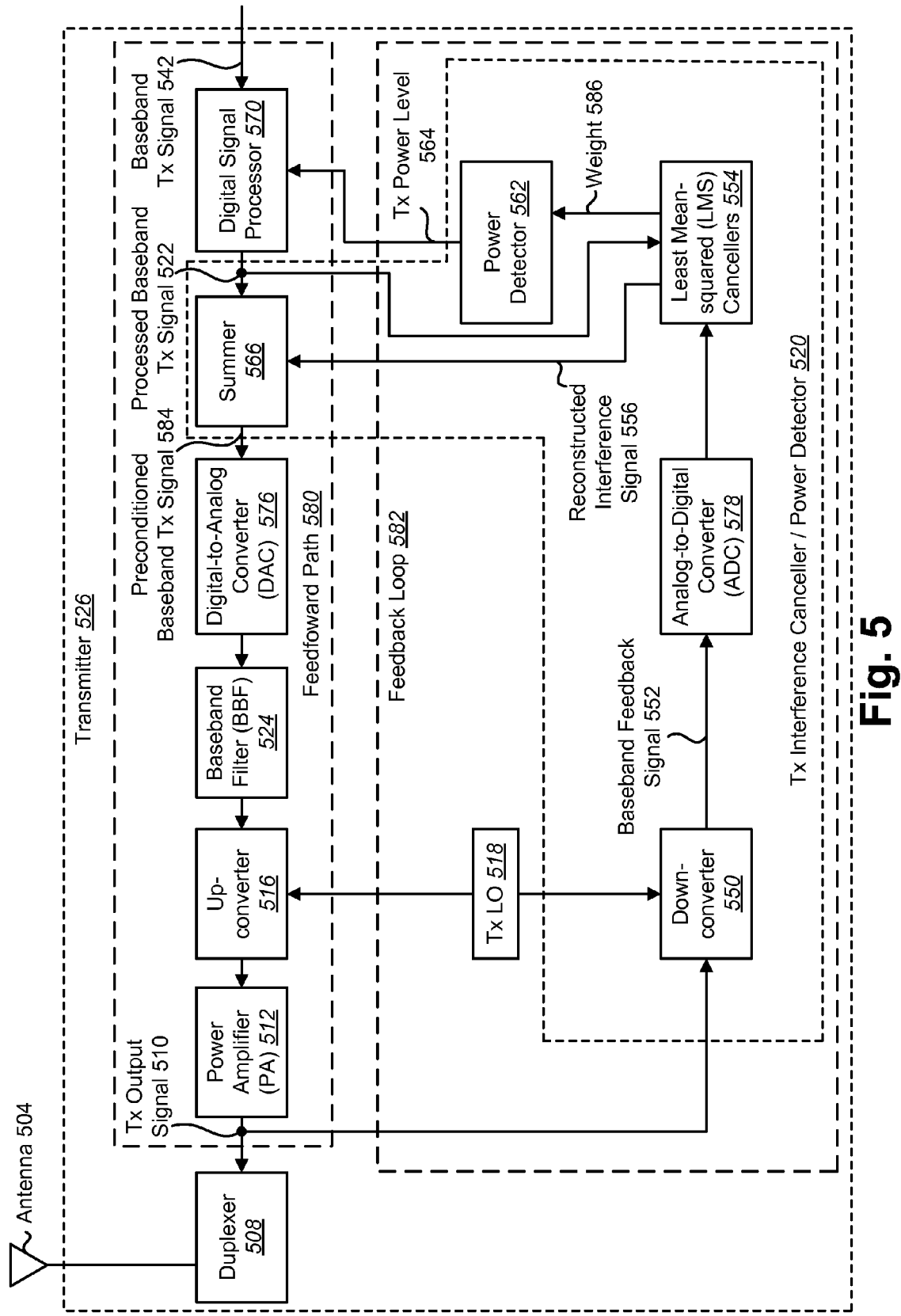

TRANSMIT (TX) INTERFERENCE CANCELLER AND POWER DETECTOR

TECHNICAL FIELD

The present disclosure relates generally to wireless devices for communication systems. More specifically, the present disclosure relates to systems and methods for transmit (Tx) interference cancellation and power detection in a wireless device.

BACKGROUND

Electronic devices (cellular telephones, wireless modems, computers, digital music players, global positioning system units, personal digital assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the downlink throughput, as well as desired functionality, has also increased.

Electronic devices have also become smaller and cheaper. To facilitate both decrease in size and decrease in cost, additional circuitry and more complex circuitry are being used on integrated circuits. Benefits may be realized by improvements to electronic devices that allow an electronic device to reuse circuitry while increasing the functionality of the electronic device.

SUMMARY

A method for Tx interference cancellation and power detection in a wireless device is described. A portion of a Tx output signal is down-converted to generate a feedback signal. A reconstructed interference signal and a weight are generated based on the feedback signal. A Tx power level is detected based on the weight. The reconstructed interference signal is subtracted from the Tx output signal.

Generating the reconstructed interference signal and the weight, detecting the Tx power level, and subtracting the reconstructed interface signal may be performed in the digital domain. The portion of the Tx output signal may be down-converted using a frequency from a Tx local oscillator.

A baseband Tx signal may be amplified using a driver amplifier coupled to a power amplifier to obtain the Tx output signal. The weight may be based on signal gain between the baseband Tx signal and the Tx output signal. The weight may include a real weight component and an imaginary weight component. The real weight component may be $A \sin(\phi)/2$ and the imaginary weight component may be $A \cos(\phi)/2$.

Detecting the Tx power level may include adding together a squared real weight component with a squared imaginary weight component to obtain the Tx power level. The Tx power level may be detected using root mean square calculations on the weight. The reconstructed interference signal may be subtracted from the Tx output signal prior to up-converting and amplifying the baseband transmit signal.

An output power of the wireless device may be adjusted based on the Tx power level. Adjusting the output power of the wireless device may include adjusting amplification of a power amplifier. Adjusting the output power may include matching the detected Tx power level to a look-up table and obtaining the output power from the look-up table.

The reconstructed interference signal and the weight may be generated reusing least mean-squared cancellers on the wireless device. The least mean-squared cancellers may isolate a desired Tx signal of the feedback signal. The least mean-squared cancellers may remove the desired Tx signal from the feedback signal, leaving only noise and interference in the reconstructed interference signal. A phase shift may be applied to the reconstructed interference signal prior to subtracting the reconstructed interference signal from the Tx output signal.

An apparatus for Tx interference cancellation and power detection is also described. The apparatus includes a feedforward path configured to generate a Tx output signal from a baseband Tx signal. The apparatus also includes a feedback loop. The feedback loop includes a Tx interference canceller/power detector that generates a reconstructed interference signal and a weight from a feedback signal and that detects a Tx power level based on the weight. The feedback loop also includes a summer that subtracts the reconstructed interference signal from the Tx output signal.

The Tx interference canceller/power detector and the summer may operate in the digital domain. A portion of the Tx output signal may be used as the feedback signal. The feedback signal may be down-converted using a frequency from a Tx local oscillator. The Tx interference canceller/power detector may detect the Tx power level by adding together a squared real weight component with a squared imaginary weight component. The Tx interference canceller/power detector may detect the Tx power level by using root mean square calculations on the weight.

A computer-program product for Tx interference cancellation and power detection in a wireless device is described. The computer-program product includes a non-transitory computer-readable medium with instructions thereon. The instructions include code for causing the wireless device to down-convert a portion of a Tx output signal to generate a feedback signal. The instructions also include code for causing the wireless device to generate a reconstructed interference signal and a weight based on the feedback signal. The instructions further include code for causing the wireless device to detect a Tx power level based on the weight. The instructions also include code for causing the wireless device to subtract the reconstructed interference signal from the Tx output signal.

A wireless device for Tx interference cancellation and power detection is also described. The wireless device includes means for down-converting a portion of a Tx output signal to generate a feedback signal. The wireless device also includes means for generating a reconstructed interference signal and a weight based on the feedback signal. The wireless device further includes means for detecting a Tx power level based on the weight. The wireless device also includes means for subtracting the reconstructed interference signal from the Tx output signal.

BRIEF DESCRIPTION OF THE DRAWINGS

FIG. 5 is a block diagram illustrating yet another configuration of a transmitter that includes a Tx interference canceller/power detector;

DETAILED DESCRIPTION

Figure 1:
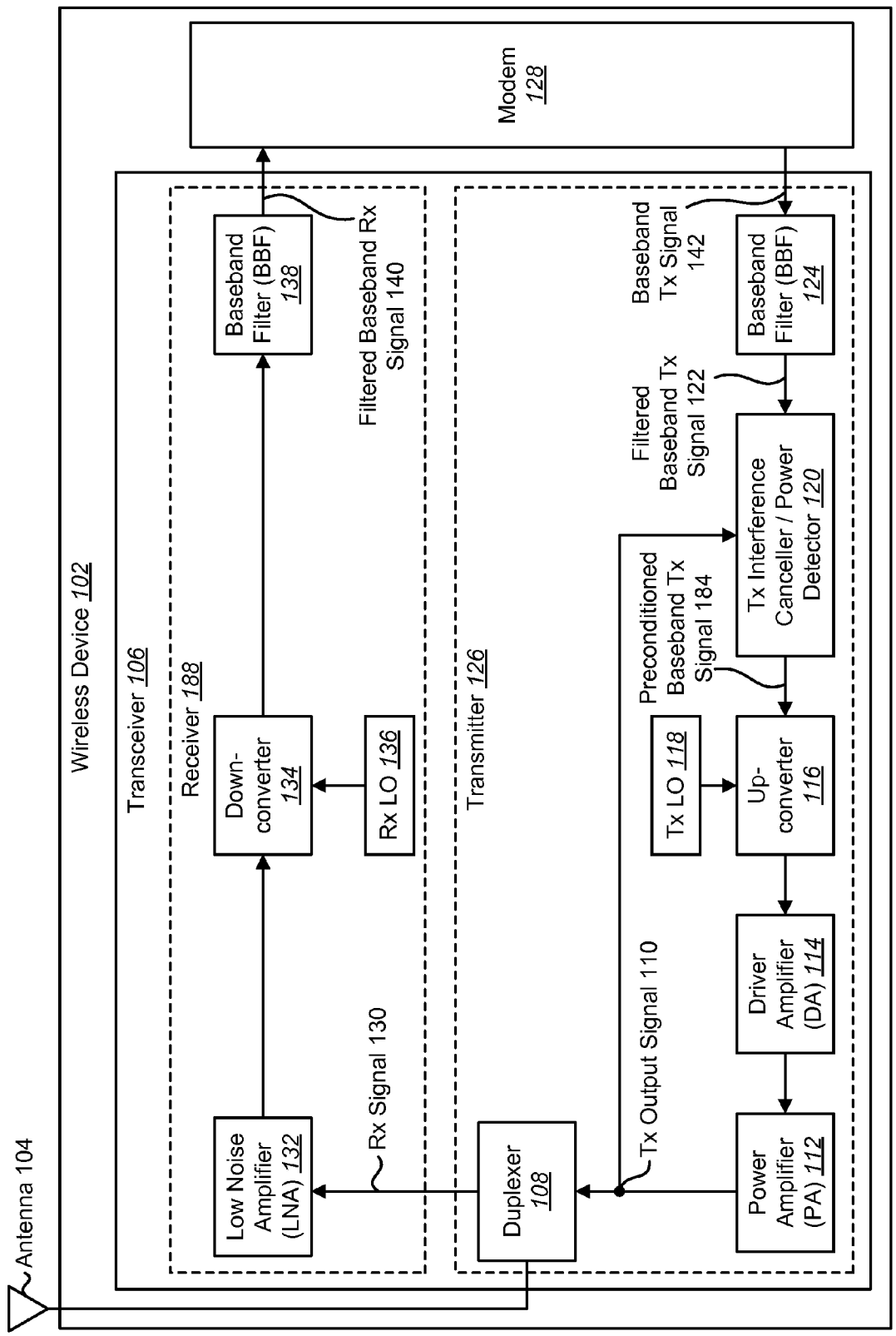
FIG. 1 shows a wireless device for use in the present systems and methods.

FIG. 1 shows a wireless device 102 for use in the present systems and methods. The wireless device 102 may be configured for Tx interference cancellation and power detection. The wireless device 102 may use a single set of components (e.g., a Tx feedback receiver) for measuring Tx power and for cancelling Tx interference (e.g., noise and/or distortion), rather than requiring separate components (receivers) for each procedure. Because many functions of the wireless device 102 are common between the power measurement and the Tx interference cancellation, the reuse of the common components for two functions allows the wireless device 102 to reduce die area, conserve power consumption and eliminate the need for a digital pre-distortion component.

The wireless device 102 may be a base station or a wireless communication device. A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, a PC card, compact flash, an external or internal modem, a wireline phone, etc. A wireless communication device may be mobile or stationary. Additional detail regarding wireless communication devices is given below in relation to FIG. 6.

A base station is a station that communicates with one or more wireless communication devices. A base station may also be referred to as, and may include some or all of the functionality of, an access point, a broadcast transmitter, a NodeB, an evolved NodeB (eNB), etc. A base station may be mobile or stationary. Additional detail regarding base stations is given below in FIG. 6.

The wireless device 102 may include an antenna 104, a transceiver 106 and a modem 128. The antenna 104 may be used for both receiving and transmitting. In some configurations, the wireless device 102 may include multiple antennas.

The transceiver 106 may include a transmitter 126 and a receiver 188. The receiver 188 may receive an Rx signal 130 and process the Rx signal 130 to obtain a filtered baseband Rx signal 140. The transmitter 126 may process a baseband Tx signal 142 to obtain a Tx output signal 110, which is transmitted via the antenna 104.

A duplexer 108 may allow the antenna 104 to both receive an Rx signal 130 and to transmit a Tx output signal 110 simultaneously. In other words, the duplexer 108 allows for bi-directional (duplex) communication over a single path, such as the antenna 104. For example, in full-duplex mode, the wireless device 102 may send Tx output signals 110 and receive Rx signals 130 at the same time. It should be noted that for simplicity, the duplexer 108 is shown as part of the transmitter 126, however, the same duplexer 108 may be employed by both the receiver 188 and the transmitter 126.

In some full-duplex systems, a portion of the Tx output signal 110 may leak onto the received Rx signal 130. Tx noise and distortion from the Tx output signal 110 may degrade the signal quality of the Rx signal 130. For example, the Tx noise may leak through the duplexer 108 into the Rx signal 130, which may degrade the Rx sensitivity. Furthermore, when the power level of the Tx output signal 110 is too high, Tx leakage may spread into adjacent channels as sidebands.

The receiver 188 may include the duplexer 108, a low noise amplifier (LNA) 132, a down-converter 134 that receives a frequency from an Rx local oscillator (LO) 136, and a baseband filter (BBF) 138. The duplexer 108 may include one or more filters, such as a surface acoustic wave (SAW) filter or a bulk acoustic wave (BAW) filter, to isolate the desired frequency sent or received via the antenna 104. For example, the duplexer 108 may be a surface acoustic wave (SAW) duplexer.

An Rx signal 130 may be received via the antenna 104. The duplexer 108 may provide isolation between the Rx signal 130 and a Tx output signal 110. The Rx signal 130 may be amplified by the low noise amplifier (LNA) 132. The Rx signal 130 may be down-converted to a baseband frequency by the down-converter 134 and filtered by the baseband filter (BBF) 138. The baseband filter (BBF) 138 may output a filtered baseband Rx signal 140 to the modem 128 for digital processing.

The transmitter 126 may include a baseband filter (BBF) 124, a Tx interference canceller/power detector 120, an up-converter 116 that receives an up-convert frequency from a Tx local oscillator (LO) 118, a driver amplifier (DA) 114, a power amplifier (PA) 112 and the duplexer 108. The duplexer 108 may be employed in both the Rx path and the Tx path (e.g., in both the transmitter 126 and the receiver 188).

The modem 128 may provide a baseband Tx signal 142 (to be transmitted) to the transmitter 126. The baseband Tx signal 142 provided by the modem 128 may be filtered by the baseband filter (BBF) 124 to produce a filtered baseband Tx signal 122. The filtered baseband Tx signal 122 may be provided to the Tx interference canceller/power detector 120.

The Tx interference canceller/power detector 120 also receives a Tx output signal 110. The Tx interference canceller/power detector 120 may detect noise and distortion in the Tx signal 110, measure linear power and modify the filtered baseband Tx signal 122 in order to reduce the noise and distortion in the Tx output signal 110. In other words, the Tx interference canceller/power detector 120 reduces noise and distortion produced by the transmitter 126. Reducing noise and distortion in the Tx output signal 110 prevents system performance and signal degradation.

In some known configurations, a digital pre-distortion component is used to reduce the distortion. However, a digital pre-distortion component requires factory calibration of each wireless device 102, which is timely to perform and costs money. The factory calibration also accounts only for those conditions that were present during calibration. For example, during factory calibration, each potential power level is tested/measured at different frequencies and temperatures so that pre-distorting transfer functions for the different frequencies and temperatures can be created. The pre-distorting transfer functions may be stored in a look-up table (LUT) of the digital pre-distortion component. However, as each wireless device 102 is subjected to different conditions, such as battery voltage, device aging, electrical stress, etc., the pre-distorting transfer functions measured at the factory become inaccurate during device usage.

Another problem with the digital pre-distortion component is that, to pass the pre-distortion components of the baseband Tx signal 142, and thus compensate for the distortion in various blocks in the transmitter 126, the bandwidth of the baseband filter (BBF) 124 must be increased. As a result, additional digital noise from the modem's 128 digital-to-analog converters (DACs) (not shown) is passed by the baseband filter (BBF) 124 into the filtered baseband Tx signal 122. To reduce the increased Tx noise, the wireless device 102 may require an additional surface acoustic wave (SAW) filter in the transmitter 126. In some known approaches, a negative feedback loop can be used to reduce the distortion and noise from the Tx output signal 110. However, a negative feedback loop generally requires additional hardware, such as a dedicated receiver, to sense the Tx output signal 110 (that includes distortion and noise). A dedicated receiver also increases the system size and power consumption.

In some known configurations, another dedicated receiver can be used in a closed-loop power control scheme, which allows the factory calibration time to be reduced. This additional dedicated receiver measures the power of the Tx output signal so that the gain and bias settings of various blocks of the transmitter 126 can be adjusted in real time.

In one known approach, the Tx power level is detected by a high power detector (HDET). In this approach, the Tx power level in the baseband Tx signal 142 may be set by the modem 128. For example, the modem 128 may include a power control and a look-up table (LUT). In conjunction with the high power detector (HDET), the look-up table (LUT) may be used to set a maximum limit of Tx power. The set Tx power level may be based on a receive signal strength indication (RSSI), an access probe parameter, one or more power control bits (PCBs) and channel configuration attributes. However, like the digital pre-distortion component, the high power detector (HDET) and the look-up table (LUT) require extensive calibration. For example, the transmitter 126 is calibrated extensively for different modes (e.g., global system for mobile communications (GSM), code division multiple access (CDMA) 1x, wideband code division multiple access (WCDMA) and long term evolution (LTE)), bands, power amplifier (PA) gain ranges, power levels and frequencies). In addition, the high power detector (HDET) path may also be required to be calibrated in an upper power range for different modes, bands and frequencies. Additional components, die space and circuitry are also required to detect the Tx power level.

In another known configuration, such as a closed-loop power control path, the Tx power level may be based on the Tx output signal 110 and may be refined based on current conditions, such as temperature. Tx power control may be initiated by a request from the modem 128. First, the Tx gain may be coarsely set by using a look-up table (LUT). Next, a single-point room-temperature power measurement may be used to correct the gain settings. The gain settings may be corrected within the 25 microseconds (μs) settling time allowed at the start of each Tx transmission slot.

In this configuration, the power measurement may be taken by a root mean square (RMS) detector that receives input from the closed feedback loop. The root mean square (RMS) detector may communicate with a power control and a look-up table (LUT) to detect and indicate power level adjustments to the wireless device.

The root mean square (RMS) detector may obtain in-phase (I) and quadrature-phase (Q) inputs (bits) from the Tx feedforward signal to align the closed feedback loop signal to more accurately detect the Tx power level. For example, I and Q bits from the transmitter and I and Q bits from the feedback may be time aligned.

The root mean square (RMS) detector may then calculate the root mean square (RMS) values of the feedforward and feedback Tx signals. Calculating the root mean square (RMS) values removes the modulation dependency and may include calculating amplitude. Calculating the root mean square (RMS) values may also include integrating and correlating the feedforward and feedback Tx signals based on a direct current. The processed feedforward and feedback Tx signals may then have their logarithmic values taken and compared to determine the gain or the Tx power level. The detected Tx power level may then be used to adjust the power level of the Tx output signal 110. However, even in this configuration, additional non-common and non-shared components are required to detect power levels. Further, this configuration does not account for Tx noise and distortion in the Tx output signal 110.

In contrast to the known configurations, schemes and approaches described above, the Tx interference canceller/power detector 120 may provide both Tx noise/distortion reduction and Tx power detection while not requiring separate additional components in a wireless device 102. In other words, the wireless device 102, in some configurations of the present disclosure, may combine both a power detector and a Tx interference canceller (via a negative feedback path) into a single feedback receiver (i.e., the Tx interference canceller/power detector 120), without requiring separate additional hardware. The Tx interference canceller/power detector 120 may thus include a Tx interference canceller portion and a Tx power detector portion.

The Tx interference canceller portion may detect and cancel interference, such as noise and distortion, in the Tx output signal 110. For example, the Tx interference canceller/power detector 120 may output a reconstructed interference signal to cancel out the Tx noise and distortion. Additional detail regarding the Tx interference cancellation is provided below.

The Tx power detector portion may detect the Tx power level. The detected Tx power level may be used to adjust the gain of various blocks of the transmitter 126 and to set the Tx power of the Tx output signal 110. The Tx interference canceller/power detector 120 may produce a preconditioned baseband Tx signal 184, which may be up-converted by the up-converter 116 and amplified by the driver amplifier (DA) 114 and the power amplifier (PA) 112 to obtain the Tx output signal 110. The Tx output signal 110 may be passed through the duplexer 108 and transmitted by the wireless device 102 via the antenna 104.

Figure 2:
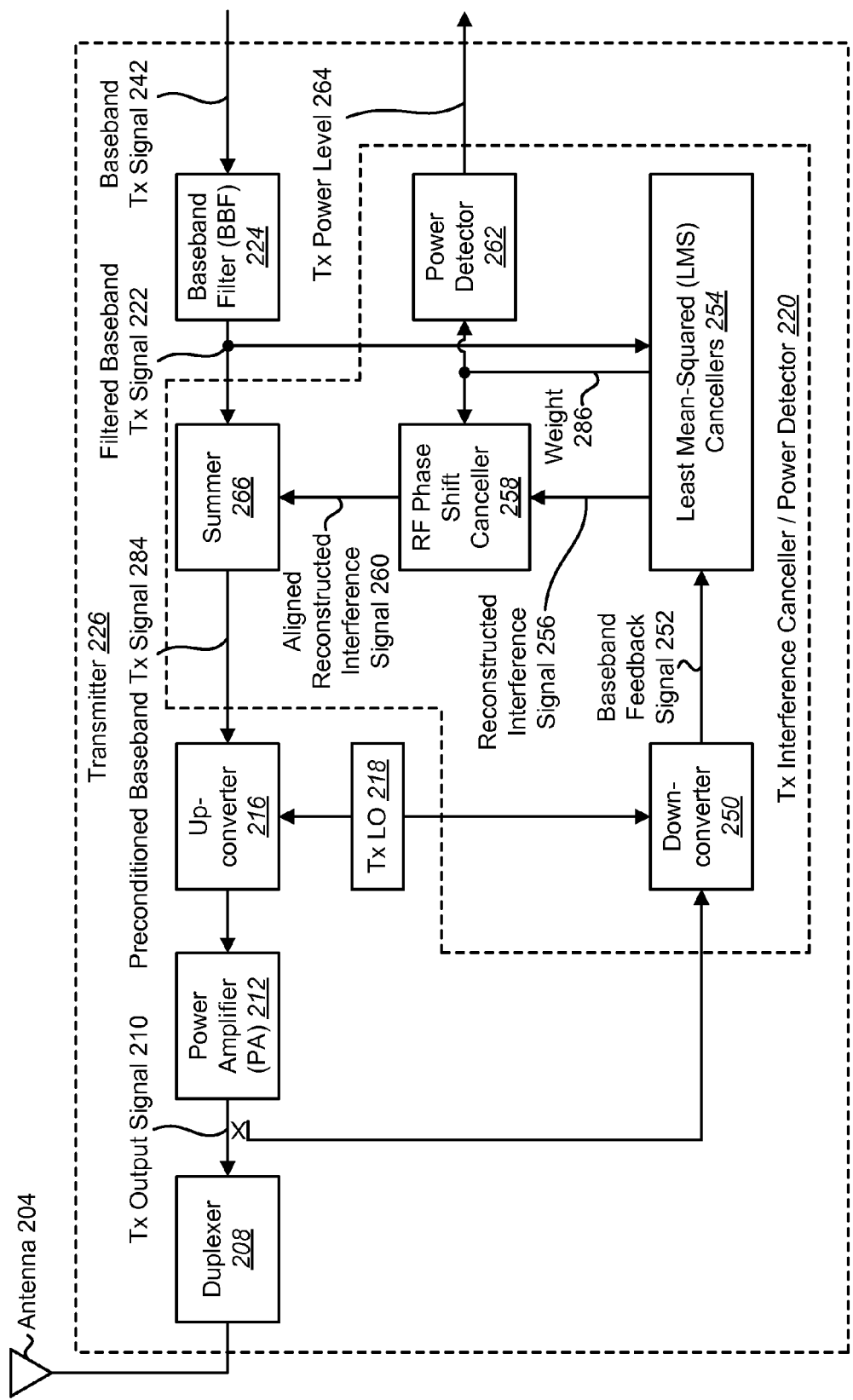
FIG. 2 is a block diagram illustrating a transmitter that includes Tx interference cancellation and power detection.

FIG. 2 is a block diagram illustrating a transmitter 226 that includes Tx interference cancellation and power detection. The transmitter 226 may be one configuration of the transmitter 126 described in connection with FIG. 1. For example, the transmitter 226 may be part of the wireless device 102 of FIG. 1. In addition to the transmitter 226, an antenna 204 is also illustrated in FIG. 2.

The transmitter 226 may include a feedforward path that includes a baseband filter (BBF) 224, a summer 266, an up-converter 216, a power amplifier (PA) 212 and a duplexer 208. In some configurations, the summer 266 may be referred to as an adder or a subtractor.

A baseband Tx signal 242 may be provided to the transmitter 226 by a modem 128. It should be appreciated that while a single baseband Tx signal 242 is illustrated, the baseband Tx signal 242 may include an in-phase (I) baseband Tx signal 242 and a quadrature-phase (Q) baseband Tx signal 242.

The baseband filter (BBF) 224 may filter the baseband Tx signal 242 and provide a filtered baseband Tx signal 222 to the least mean-squared (LMS) cancellers 254 and the summer 266. The summer 266 may output a preconditioned baseband Tx signal 284, which may then be up-converted by the up-converter 216, amplified by the power amplifier (PA) 212, passed through the duplexer 208 and transmitted via the antenna 204.

The transmitter 226 may also include a Tx interference canceller/power detector 220 that includes a down-converter 250, the least mean-squared (LMS) cancellers 254, a radio frequency (RF) phase shift canceller 258, a power detector 262 and the summer 266. The Tx interference canceller/power detector 220 may form a negative feedback loop together with the feedforward Tx path. In other words, the feedback loop may filter out the desired Tx signal to be transmitted (from the baseband Tx signal 242). The feedback loop may provide a reconstructed interference signal 256 or an aligned reconstructed interference signal 260 to the summer 266 to cancel out Tx interference (noise and/or distortion) produced by the transmitter 226. The feedback loop may also provide a Tx power level 264, which may be used in adjusting the power level of the Tx output signal 210.

The Tx output signal 210 may be down-converted by a down-converter 250 to obtain a baseband feedback signal 252. The down-converter 250 may be driven by the Tx local oscillator (LO) 218. The Tx local oscillator (LO) 218 may also drive the up-converter 216. In some configurations, the down-converter 250 and the up-converter 216 may be driven by the local oscillator (LO) signals $\sin(\omega t)$ or $\cos(\omega t)$ (where $\omega$ is the frequency and t is a measure of time). By using $\sin(\omega t)$ or $\cos(\omega t)$ to drive the down-converter 250, Cartesian feedback methods may be employed to cancel out Tx noise and distortion.

The baseband feedback signal 252 may be provided to the least mean-squared (LMS) cancellers 254. The least mean-squared (LMS) cancellers 254 may also obtain the filtered baseband Tx signal 222. The least mean-squared (LMS) cancellers 254 may generate a reconstructed interference signal 256. The reconstructed interference signal 256 may include the Tx noise and distortion from the baseband feedback signal 252. In other words, the least mean-squared (LMS) cancellers 254 may generate the reconstructed interference signal 256 to include the Tx noise and distortion from the baseband feedback signal 252 and not include any of the desired Tx signal.

The reconstructed interference signal 256 may be provided to an RF phase shift canceller 258. The RF phase shift canceller 258 may correct and align (e.g., time align) the phase of the reconstructed interference signal 256 to match the phase of the filtered baseband Tx signal 222. The RF phase shift canceller 258 may output an aligned reconstructed interference signal 260 to the summer 266. The summer 266 may subtract the aligned reconstructed interference signal 260 from the filtered baseband Tx signal 222 to cancel out the Tx noise and distortion produced by the transmitter 226. In some configurations, the reconstructed interference signal 256 may be provided directly to the summer 266 without phase correction. In this configuration, the RF phase shift canceller 258 may be bypassed or omitted from the Tx interference canceller/power detector 220.

The least mean-squared (LMS) cancellers 254 may also generate a weight 286 (e.g., gain) between the baseband feedback signal 252 and the filtered baseband Tx signal 222. The weight 286 may be provided to the power detector 262 and the RF phase shift canceller 258.

The power detector 262 may determine the Tx power level 264 of the Tx signal 242 based on the weight 286. For example, the power detector 262 may employ root mean square (RMS) techniques. The Tx power level 264 may be provided to a modem 128. The modem 128 may adjust the power of the Tx signal 242 based on the Tx power level 264. For example, the modem 128 may match the Tx power level 264 to a look-up table (LUT) to determine the Tx power output level to be employed. In one configuration, the modem 128 may use the Tx power level 264 to direct the power amplifier (PA) 212 to reduce or increase power amplification.

It may be beneficial to reduce Tx distortion and noise, while at the same time and with the same components, detect Tx power. Overlapping the common functions between reducing Tx interference (e.g., Tx noise and distortion) and detecting Tx power levels allows the wireless device 102 to save die area and reduce power consumption. For example, by employing the systems and methods descried herein, up to 20-30 dBm (decibels of the measured power referenced to one milliwatt) of Tx distortion and noise may be attenuated. In addition, by using only 30-50 milliwatts (mW) in the power detector 262, 200-300 mW may be saved, for example, at the power amplifier (PA) 112. Another benefit is that settling time is reduced to within 10 microseconds (μs).

By reusing the same feedback receiver and employing the Tx interference canceller/power detector 220, as described herein, the need for a digital pre-distortion component and a surface acoustic wave (SAW) filter is eliminated. Thus, this eliminates the need for timely and expansive factory calibration procedures performed on the wireless device 102.

Figure 3:
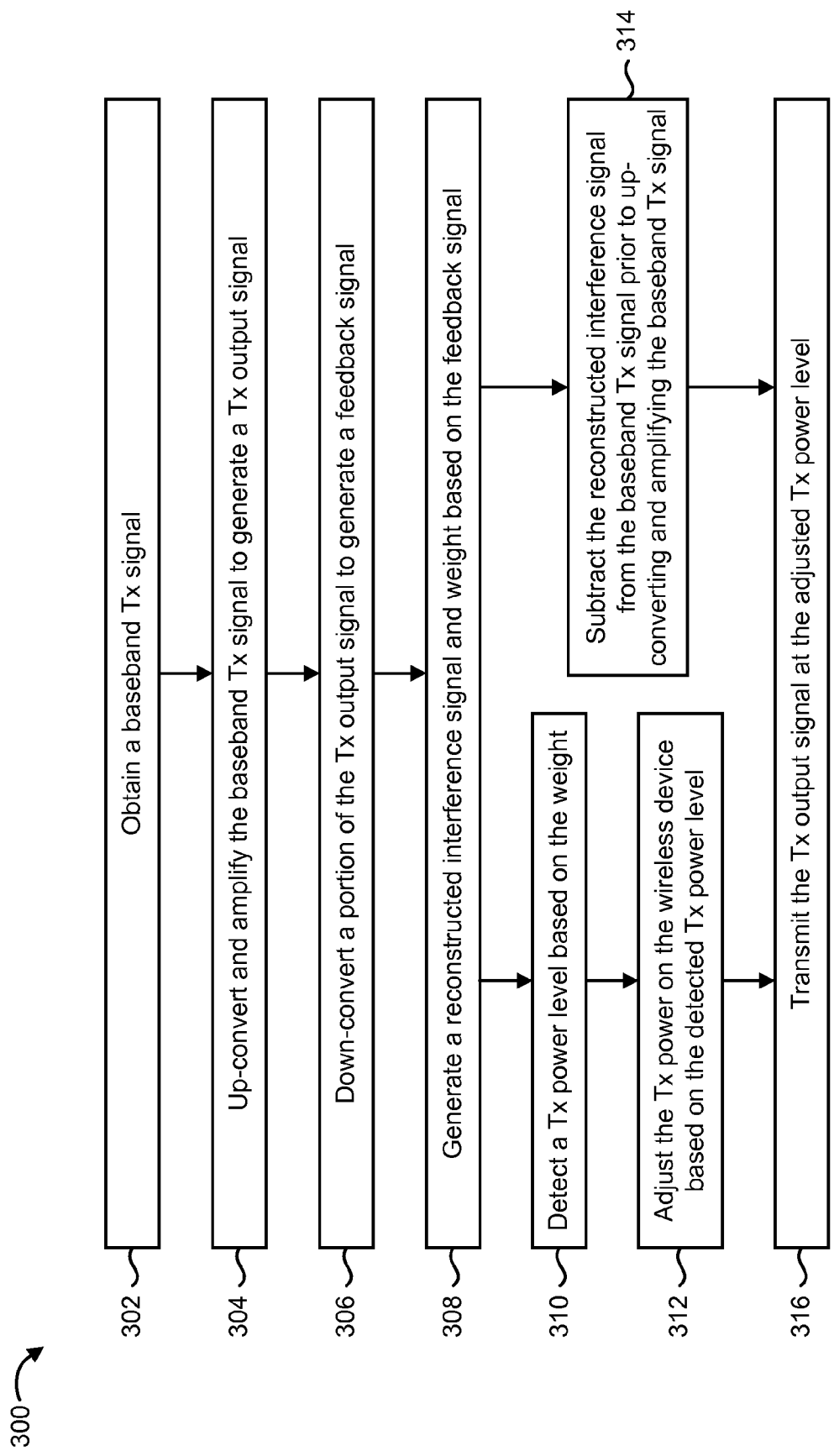
FIG. 3 is a flow diagram of a method for Tx interference cancellation and power detection in a wireless device.

FIG. 3 is a flow diagram of a method 300 for Tx interference cancellation and power detection in a wireless device 102. The method 300 may be performed by the wireless device 102. The wireless device 102 may be a wireless communication device or a base station. The wireless device 102 may include a Tx interference/power detector 120. The wireless device 102 may obtain 302 a baseband Tx signal 142. In one configuration, the baseband Tx signal 142 may be filtered by the baseband filter (BBF) 124 to obtain a filtered baseband Tx signal 122. The baseband Tx signal 142 may be obtained from the modem 128.

The wireless device 302 may up-convert 304 and amplify the baseband Tx signal 142 (in a transmitter 126) to generate a Tx output signal 110. In one configuration, the baseband Tx signal 142 may be up-converted by an up-converter 116 and amplified by a power amplifier (PA) 112 and/or a driver amplifier (DA) 114.

The wireless device 102 may down-convert 306 a portion of the Tx output signal 110 to generate a baseband feedback signal 252 (at the baseband frequency). The baseband feedback signal 252 may include the desired Tx output signal as well as Tx noise and distortion.

The wireless device 102 may generate 308 a reconstructed interference signal 256 and a weight 286 based on the baseband feedback signal 252. The reconstructed interference signal 256 may include isolated Tx noise and distortion from the baseband feedback signal 252. Thus, the reconstructed interference signal 256 may not include the desired portion of the Tx output signal 210.

The weight 286 may represent the gain in the baseband feedback signal 252. In other words, the weight 286 may indicate the gain difference between the baseband feedback signal 252 and the baseband Tx signal 242. The wireless device 102 may detect 310 a Tx power level based on the weight 286. For example, the wireless device 102 may determine the Tx power level 264 using the power detector 262 and the weight 256.

The wireless device 102 may adjust 312 the Tx power on the wireless device 102 based on the Tx power level 264. For example, the Tx power level 264 may be provided to a modem 128 or other component on the wireless device 102 that can then adjust the output power level. In one configuration, the modem 128 may adjust the power amplifier (PA) 112 to change the amplification levels of the transmitter (and thus the amplitude of the Tx output signal 110). In some configurations, the power detector 262 may directly indicate to various components of the transmitter 126, such as the power amplifier (PA) 112, to adjust the Tx output power. Reducing the Tx output power level conserves power on the wireless device 102 and prevents Tx signals from interfering with adjacent channels and sidebands.

The wireless device 102 may subtract 314 the reconstructed interference signal 256 from the baseband Tx signal 142 prior to up-converting and amplifying the baseband Tx signal 142. In one configuration, the wireless device 102 may first adjust the phase of the reconstructed interference signal 256 to obtain an aligned reconstructed interference signal 260. The wireless device 102 may then subtract the aligned reconstructed interference signal 260 from the baseband Tx signal 142 (or from the filtered baseband Tx signal 222). For example, a summer 266 may subtract the reconstructed interference signal 256 from the baseband Tx signal 142 to reduce Tx noise and distortion in the Tx output signal 210. Reducing the Tx noise and distortion reduces the level of Tx leakage that leaks in the received Rx signal 130.

The wireless device 102 may transmit 316 the Tx output signal 110 at the adjusted Tx power level. In this manner, the wireless device 102 may reduce the noise or interference produced by the transmitter 126 in the transmitted Tx output signal 110. In addition, the wireless device 102 may transmit the Tx output signal 110 at a Tx power level 264 that prevents the Tx signal from interfering with adjacent signals. In one configuration, the wireless device 102 may detect 310 a Tx power level 264 and adjust 312 the Tx power on the wireless device 312 while simultaneously subtracting 314 the reconstructed interference signal 256 from the baseband Tx signal 242.

Figure 4:
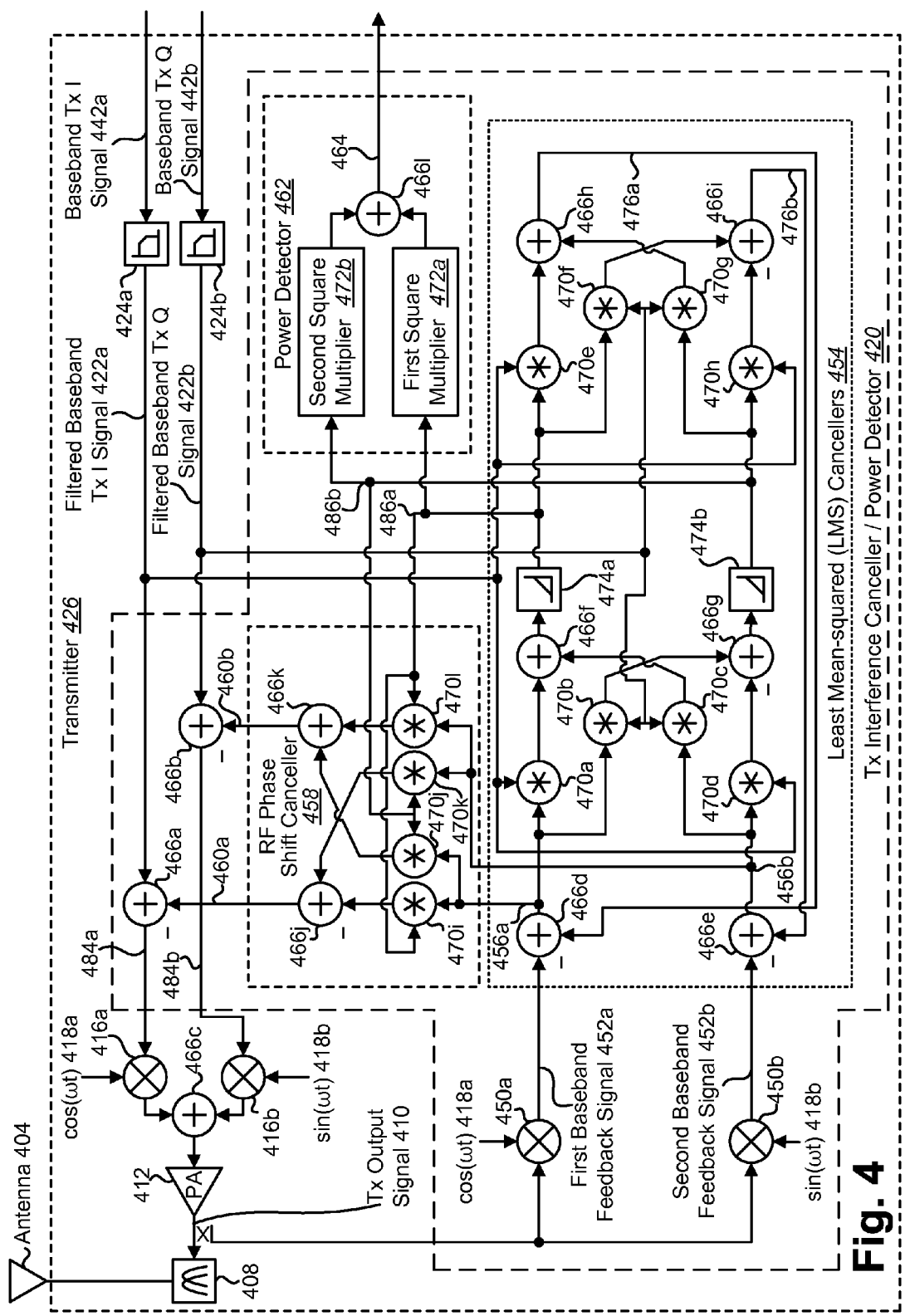
FIG. 4 is a block diagram illustrating another transmitter that includes a Tx interference canceller/power detector.

FIG. 4 is a block diagram illustrating another transmitter 426 that includes a Tx interference canceller/power detector 420. The transmitter 426 may be one configuration of the transmitter 126 described in connection with FIG. 1 and/or the transmitter 226 described in connection with FIG. 2. The transmitter 426 may be part of a wireless device 102. In addition to the transmitter 426, an antenna 404 is also illustrated in FIG. 4.

The transmitter 426 may include a feedforward path that includes a first baseband filter (BBF) 424a, a first summer 466a, a first up-converter 416a, a second baseband filter (BBF) 424b, a second summer 466b, a second up-converter 416b, a third summer 466c, a power amplifier (PA) 412 and a duplexer 408.

Figure 4A:
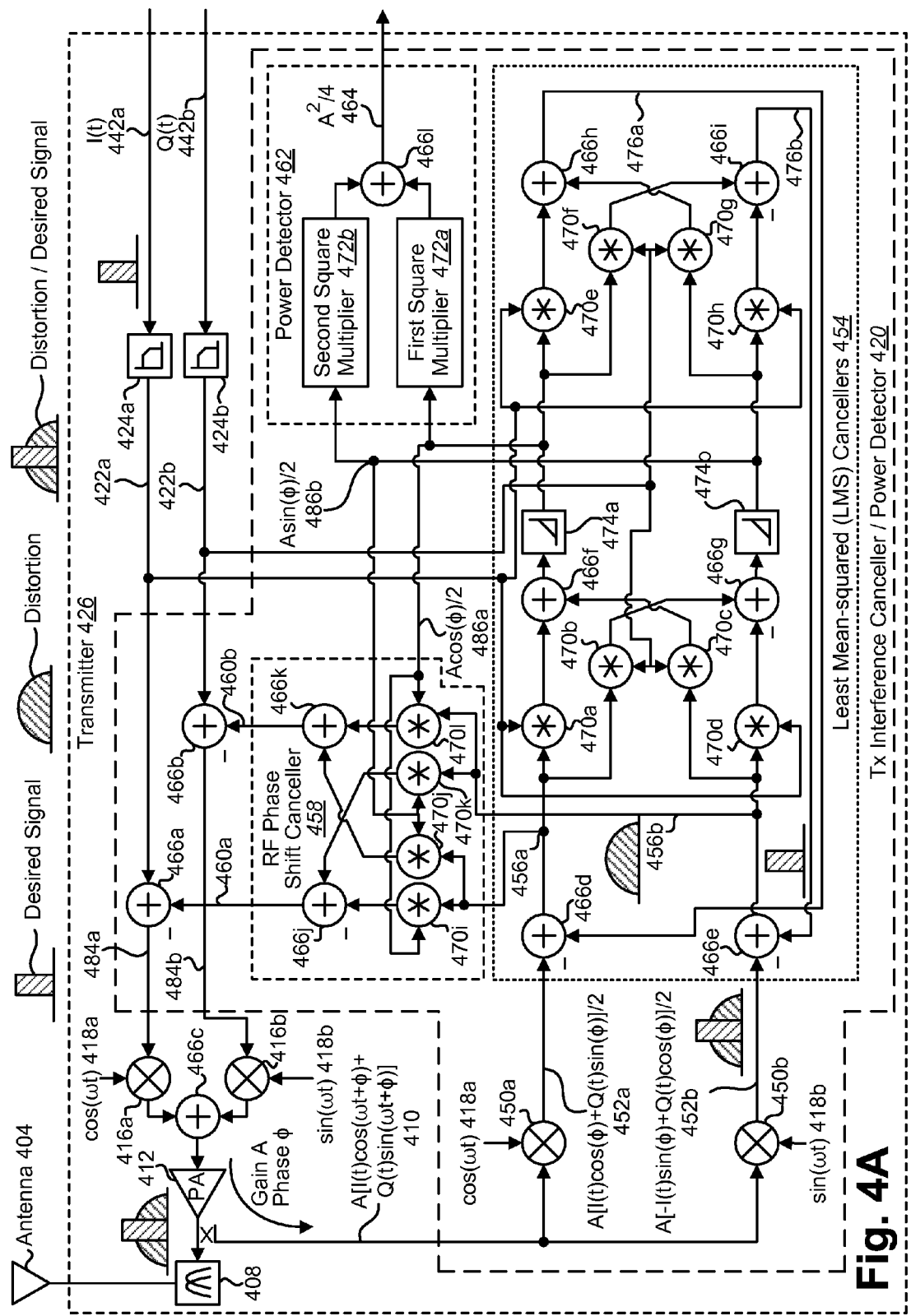
FIG. 4A is a block diagram illustrating one exemplary configuration of the transmitter shown in FIG. 4.

As illustrated in FIG. 4, the feedforward path may be divided into an in-phase component (I) and a quadrature-phase component (Q). For example, the feedforward path may include a baseband Tx I signal 442a and a baseband Tx Q signal 442b, a filtered baseband Tx I signal 422a and a filtered baseband Tx Q signal 422b, a preconditioned baseband Tx I signal 484a and a preconditioned baseband Tx Q signal 484b. The inphase (I) signals may be referenced by I(t), where t is a measure of time. The quadrature (Q) signals may be referenced by Q(t). FIG. 4A, described below, provides more detail on the I(t) signal, the Q(t) signal, and providing Cartesian feedback.

The baseband Tx I signal 442a may be filtered by the first baseband filter (BBF) 424a to obtain the filtered baseband Tx I signal 422a. The baseband Tx Q signal 442b may be filtered by the second baseband filter (BBF) 424b to obtain the filtered baseband Tx Q signal 422b. The filtered baseband Tx I signal 422a and the filtered baseband Tx Q signal 422b may be provided to the least mean-squared (LMS) cancellers 454.

The filtered baseband Tx I signal 422a may be summed with a first aligned reconstructed interference signal 460a by the first summer 466a to obtain a preconditioned baseband Tx I signal 484a. The preconditioned baseband Tx I signal 484a may be up-converted by the first up-converter 416a. The first up-converter 416a may be driven by $\cos(\omega t)$ 418a.

The filtered baseband Tx Q signal 422b may be summed with a second aligned reconstructed interference signal 460b by the second summer 466b to obtain a preconditioned baseband Tx Q signal 484b. The preconditioned baseband Tx Q signal 484b may be up-converted by the second up-converter 416b. The second up-converter 416b may be driven by $\sin(\omega t)$ 418b.

The output of the first up-converter 416a and the output of the second up-converter 416b may be combined using the third summer 446c and amplified by the power amplifier (PA) 412 to obtain a Tx output signal 410. The Tx output signal 410 may be passed through the duplexer 408 and transmitted via the antenna 404.

A portion of the Tx output signal 410 may also be provided to a feedback loop (e.g., a Tx interference canceller/power detector 420). The portion of the Tx output signal 410 that is provided to the feedback loop may include both an in-phase (I) component and a quadrature-phase component (Q), such as $A[I(t)\cos(\omega t+\phi)+Q(t)\sin(\omega t+\phi)]$, where A is the amplitude, $\phi$ is the phase and t is a measure of time. The phase may correspond to the phase difference between comparable signals, such as the filtered baseband Tx I signal 422a and a first baseband feedback signal 452a.

The feedback loop includes a Tx interference canceller/power detector 420. The Tx interference canceller/power detector 420 may include a first up-converter 450a, a second up-converter 450b, the first summer 466a, the second summer 466b, a fourth summer 466d, a fifth summer 466e, the least mean-squared (LMS) cancellers 454, an RF phase shift canceller 458 and a power detector 462.

The first up-converter 450a may be driven by $\cos(\omega t)$ 418a. The second up-converter 450b may be driven by $\sin(\omega t)$ 418b. By using $\cos(\omega t)$ 418a and $\sin(\omega t)$ 418b, Cartesian feedback may be employed.

The portion of the Tx output signal 410 may be up-converted by the first up-converter 450a to obtain a first baseband feedback signal 452a. The first baseband feedback signal 452a may be expressed as $A[I(t)\cos(\phi)+Q(t)\sin(\phi)]/2$. The portion of the Tx output signal 410 may also be up-converted by the second up-converter 450b to obtain a second baseband feedback signal 452b. The second baseband feedback signal 452b may be expressed as $A[-I(t)\sin(\phi)+Q(t)\cos(\phi)]/2$. The first baseband feedback signal 452a and the second baseband feedback signal 452b may each include portions of the desired Tx signal and the Tx noise and distortion.

The least mean-squared (LMS) cancellers 454 may generate correlation coefficients (e.g., the weight 486). The least mean-squared (LMS) cancellers may also isolate Tx noise and interference generated by the transmitter 426 by filtering out the desired Tx signal from the provided feedback signal (e.g., the portion the Tx output signal 410 provided to the feedback loop).

The least mean-squared (LMS) cancellers 454 may use Cartesian feedback from the first baseband feedback signal 452a and the second baseband feedback signal 452b to obtain a reconstructed interference signal 456. The least mean-squared (LMS) cancellers 454 may perform complex multiplication and cross coupling to determine a correlation coefficient (e.g., weight 486 or gain) of the first baseband feedback signal 452a and the second baseband feedback signal 452b.

The first baseband feedback signal 452a may be provided to a first multiplier 470a and a second multiplier 470b. The first multiplier 470a may multiply the first baseband feedback signal 452a with the filtered baseband Tx I signal 422a. The second multiplier 470b may multiply the first baseband feedback signal 452a with the filtered baseband Tx Q signal 422b.

The second baseband feedback signal 452b may be provided to a third multiplier 470c and a fourth multiplier 470d. The third multiplier 470c may multiply the second baseband feedback signal 452b with the filtered baseband Tx Q signal 422b. The fourth multiplier 470d may multiply the second baseband feedback signal 452b with the filtered baseband Tx I signal 422a.

The output of the first multiplier 470a and the output of the third multiplier 470c may be added by a sixth summer 466f and provided to a first integrator 474a. The output of the fourth multiplier 470d may be subtracted from the output of the second multiplier 470b by a seventh summer 466g and provided to a second integrator 474b. In some configurations, the first integrator 474a and the second integrator 474b may each be narrow-pass filters.

The first integrator 474a and the second integrator 474b may each integrate signals over time to determine how much gain or weight 486 is present. For example, the first integrator 474a may integrate the baseband I signal 322a with the output of the sixth summer 466f to determine a DC value, which represents the amount of gain in the first baseband feedback signal 452a relative to the filtered baseband Tx I signal 422a.

The first integrator 474a may output a first weight 486a. The first weight 486a may represent the gain in the first baseband feedback signal 452a relative to the filtered baseband Tx signals 422. The second integrator 474b may output a second weight 486b. The second weight 486b may represent the gain in the second baseband feedback signal 452b relative to the filtered baseband Tx signals 422. In this manner, the least mean-squared (LMS) cancellers 454 performs complex multiplication and cross coupling to determine the gain of the first baseband feedback signal 452a and the gain of the second baseband feedback signal 452b.

The first weight 486a may include a real component, such as $A \sin(\phi)/2$ and the second weight 486b may include an imaginary component, such as $A \cos(\phi)/2$. The first weight 486a and the second weight 486b may each be provided to the power detector 462 and the RF phase shift canceller 458.

The least mean-squared (LMS) cancellers 454 may employ complex multiplication and cross coupling to reconstruct the linear response. For example, the first weight 486a may also be used by the least mean-squared (LMS) cancellers 454 to reconstruct a linear response (e.g., the desired Tx signal 476a-b) from the filtered baseband Tx I signal 422a. The first weight 486a may be provided to a fifth multiplier 470e and a sixth multiplier 470f. The fifth multiplier 470e may multiply the first weight 486a with the filtered baseband Tx I signal 422a. The sixth multiplier 470f may multiply the first weight 486a with the filtered baseband Tx Q signal 422b.

The second weight 486b may also be used by the least mean-squared (LMS) cancellers 454 to reconstruct a linear response (e.g., the desired Tx signal 476a-b) from the filtered baseband Tx Q signal 422b. The second weight 486b may be provided to a seventh multiplier 470g and an eighth multiplier 470h. The seventh multiplier 470g may multiply the second weight 486b with the filtered baseband Tx Q signal 422b. The eighth multiplier 470h may multiply the second weight 486b with the filtered baseband Tx I signal 422a.

The output of the fifth multiplier 470e and the output of the seventh multiplier 470g may be added by the eighth summer 466h to obtain a first desired Tx signal 476a. The first desired Tx signal 476a may be provided to a fourth summer 466d (to remove the first desired Tx signal 476a from the first baseband feedback signal 452a). The fourth summer 466d may isolate Tx noise and distortion by subtracting out the first estimated Tx signal from the first baseband feedback signal 452a. The output of the fourth summer 466d may be the first reconstructed interference signal 456a, which may be provided to the RF phase shift canceller 458. The first reconstructed interference signal 456a may include information corresponding to the Tx noise and distortion in the first baseband feedback signal 452a. In some configurations, if the transmitter 426 does not employ an RF phase shift canceller 458, the first reconstructed interference signal 456a may be provided to the first summer 466a.

The output of the eighth multiplier 470h may be subtracted from the output of the sixth multiplier 470f by a seventh summer 466g to obtain a second desired Tx signal 476b. The second desired Tx signal 476b may be provided to a fifth summer 466e (to remove the second desired Tx signal 476b from the second baseband feedback signal 452b). The fifth summer 466e may isolate Tx noise and distortion by subtracting out the second desired Tx signal 476b from the second baseband feedback signal 452b. The fifth summer 466e may output the second reconstructed interference signal 456b, which may be provided to the RF phase shift canceller 458. The second reconstructed interference signal 456b may include information corresponding to the Tx noise and distortion in the second baseband feedback signal 452b. In some configurations, if the transmitter 426 does not employ an RF phase shift canceller 458, the second reconstructed interference signal 456b may be provided to the second summer 466b.

The least mean-squared (LMS) cancellers 454 may determine the first desired Tx signal 476a and the second desired Tx signal 476b by correlating the gain (e.g., correlation coefficients) from the first baseband feedback signal 452a and the second baseband feedback signal 452b with the filtered baseband Tx I signal 422a and the filtered baseband Tx Q signal 422b to reproduce linear signals (i.e., the first desired Tx signal 476a and the second desired Tx signal 476b). Accordingly, the least mean-squared (LMS) cancellers 454 may remove the linear response (e.g., the desired Tx signal 476) from the baseband feedback signal 452, leaving only Tx noise and distortion.

In addition, the least mean-squared (LMS) cancellers 454 may operate using a closed-loop. By employing a closed-loop, the Tx distortion and noise from the first baseband feedback signal 452a and the second baseband feedback signal 452b may be captured in the least mean-squared (LMS) cancellers 454.

The RF phase shift canceller 458 may adjust the phase of the first reconstructed interference signal 456a to be aligned with the phase of the filtered baseband Tx I signal 422a. For example, the RF phase shift canceller 458 may shift, align, rotate, etc. the phase of the first reconstructed interference signal 456a to be aligned with the filtered baseband Tx I signal 422a. Likewise, the RF phase shift canceller 458 may adjust the phase of the second reconstructed interference signal 456b to be aligned with the phase of the filtered baseband Tx Q signal 422b.

The RF phase shift canceller 458 may obtain the first reconstructed interference signal 456a from the output of the fourth summer 466d, the second reconstructed interference signal 456b from the output of the fifth summer 466e, the first weight 486a and the second weight 456b. The first reconstructed interference signal 456a may be provided to a ninth multiplier 470i and a tenth multiplier 470j. The second reconstructed interference signal 456b may be provided to an eleventh multiplier 470k and a twelfth multiplier 470l. The first weight 486a may be provided to the tenth multiplier 470j and the eleventh multiplier 470k. The second weight 486b may be provided to the ninth multiplier 470i and the twelfth multiplier 470l.

The output of the eleventh multiplier 470k may be subtracted from the output of the ninth multiplier 470i by the tenth summer 466j to obtain a first aligned reconstructed interference signal 460a. The first aligned reconstructed interference signal 460a may then be provided to the first summer 466a. The output of the tenth multiplier 470j and the output of the twelfth multiplier 470l may be added by the eleventh summer 466k to obtain a second aligned reconstructed interference signal 460b. The second aligned reconstructed interference signal 460b may then be provided to the second summer 466b.

The first summer 466a may subtract the first aligned reconstructed interference signal 460a from the filtered baseband Tx I signal 422a to obtain the preconditioned baseband Tx I signal 484a. The second summer 466b may subtract the second aligned reconstructed interference signal 460a from the filtered baseband Tx Q signal 422b to obtain the preconditioned baseband Tx Q signal 484b. In this manner, the first summer 466a and the second summer 466b may subtract out the Tx distortion and noise from the filtered baseband Tx signals 422a-b based on the feedback provided by the Tx interference canceller/power detector 420.

The power detector 462 may detect the Tx power level 464 of the Tx output signal 410. The wireless device 102 may use the Tx power level 464 to adjust the power of amplifiers on the transmitter 426. For example, the Tx power level 264 may be provided to a modem 128 and the modem 128 may adjust the power of the transmitter based on the Tx power level 264. In one configuration, the modem 128 may direct the power amplifier (PA) 412 to reduce power amplification, which in turn conserves power on the transmitter 426.

The power detector 462 may include a first square multiplier 472a, a second square multiplier 472b and a twelfth summer 466l. The power detector 462 may obtain the first reconstructed interference signal 456a and the second reconstructed interference signal 456b. The first weight 486a may be provided to the first square multiplier 472a. The first square multiplier 472a may multiply the first weight 486a by itself (i.e., square the first weight 486a). For example, if the first weight 486a is the real component, A cos($\phi$)/2, then the first square multiplier 472a may output A cos($\phi$)/2 times A cos($\phi$)/2, or $A^2 \cos^2(\phi)/4$.

The second square multiplier 472b may multiply the second weight 486b by itself (i.e., square the second weight 486b). For example, if the second weight 486b is the imaginary component, A sin($\phi$)/2, then the second square multiplier 472b may output A sin($\phi$)/2 times A sin($\phi$)/2, or $A^2 \sin^2(\phi)/4$.

The twelfth summer 466l adds together the output of the first square multiplier 472a and the second square multiplier 472b. The twelfth summer 466l may then output the Tx power level 464. For example, if the first square multiplier 472a outputs $A^2 \cos^2(\phi)/4$ and the second square multiplier 472b outputs $A^2 \sin^2(\phi)/4$, the twelfth summer 466l may output $A^2/4$ as the Tx power level 464.

The power detector 462 may detect the Tx power level 464 by reusing common functions on the Tx interference canceller/power detector 420. For example, because the least mean-squared (LMS) cancellers 454 determine the gain (e.g., weight 486) of the feedforward path, the power detector 462 reuses the gain for power control of the transmitter 426. Thus, the transmitter 426 may determine the Tx noise and distortion while, at the same time, the transmitter 426 may detect the Tx power level. In this manner the transmitter 426 may reduce/save die area, reduce power consumption and eliminate the need for a digital pre-distortion component and a surface acoustic wave (SAW) filter.

FIG. 4A is a block diagram illustrating one exemplary configuration of the transmitter 426 shown in FIG. 4. In other words, the transmitter 426 in FIG. 4A is an example of the transmitter illustrated in FIG. 4 and includes similar corresponding components.

As shown in FIG. 4A, the I(t) signal 442a and the corresponding Q(t) signal 442b include the desired signal. However, the Tx output 410 may include both the desired signal and distortion (i.e., a distortion/desired signal) due to noise and interference generated by the transmitter 426.

To reduce the amount of distortion in the Tx output signal 410, a feedback loop that includes the Tx interference canceller/power detector 420 may be employed. A portion of the Tx output signal 410 may be provided to a feedback loop. The Tx output signal 410 may be referred to as $A[I(t)\cos(\omega t+\phi)+Q(t)\sin(\omega t+\phi)]$.

The Tx output signal 410 (i.e., $A[I(t)\cos(\omega t+\phi)+Q(t)\sin(\omega t+\phi)]$) may be up-converted by the first up-converter 450a, which is driven by $\cos(\omega t)$ 418, to produce a first baseband feedback signal 452a (i.e. $A[I(t)\cos(\phi)+Q(t)\sin(\phi)]/2$). The Tx output signal 410 (i.e., $A[I(t)\cos(\omega t+\phi)+Q(t)\sin(\omega t+\phi)]$) may be up-converted by the second up-converter 450b, which is be driven by $\sin(\omega t)$ 418b, to produce a second baseband feedback signal 452b (i.e., $A[-I(t)\sin(\phi)+Q(t)\cos(\phi)]/2$). After being up-converted, the first baseband feedback signal 452a (i.e. $A[I(t)\cos(\phi)+Q(t)\sin(\phi)]/2$) and the second baseband feedback signal 452b (i.e., $A[-I(t)\sin(\phi)+Q(t)\cos(\phi)]/2$) may still include distortion and the desired signal (i.e., a distortion/desired signal).

The first baseband feedback signal 452a (i.e. $A[I(t)\cos(\phi)+Q(t)\sin(\phi)]/2$) and the second baseband feedback signal 452b (i.e., $A[-I(t)\sin(\phi)+Q(t)\cos(\phi)]/2$) may be provided to the least mean-squared (LMS) cancellers 454. In this manner, least mean-squared (LMS) cancellers 454 may use Cartesian feedback from the first baseband feedback signal 452a and the second baseband feedback signal 452b to obtain a reconstructed interference signal 456.

As illustrated in FIG. 4A, the least mean-squared (LMS) cancellers 454 may generate a desired signal 476, which may then be subtracted from the distortion/desired signal to isolate only the distortion signal. In other words, the least mean-squared (LMS) cancellers 454 may remove the desired signal, thereby leaving only the noise/interference.

The distortion signal may be subtracted from the distortion/desired signal to obtain a Tx output signal 410 that includes only the desired signal (not shown). In this manner, the Tx output signal 410 that is transmitted only includes the desired signal.

FIG. 5 is a block diagram illustrating yet another configuration of a transmitter 526 that includes a Tx interference canceller/power detector 520. The transmitter 526 may be one configuration of the transmitter 126 described in connection with FIG. 1. For example, the transmitter 526 may be part of the wireless device 102 of FIG. 1. In addition to the transmitter 526, an antenna 504 is also illustrated in FIG. 5.

The transmitter 526 may include a feedforward path 580 that includes a baseband filter (BBF) 524, a summer 566, an up-converter 516, a power amplifier (PA) 512 and a duplexer 508. The feedforward path 580 may also include a digital signal processor 570 and a digital-to-analog converter (DAC) 576. In some configurations, the digital signal processor 570 and/or the digital-to-analog converter (DAC) 576 may be located elsewhere on the wireless device 102, such as on a modem 128.

A baseband Tx signal 542 may be provided to the transmitter 526 (e.g., by the modem 128). For the sake of simplicity, a single baseband Tx signal 542 is illustrated. However, multiple baseband Tx signals 542, such as an in-phase (I) Tx signal and a quadrature-phase (Q) signal may be employed within the transmitter 526. The baseband Tx signal 542 may be processed by the digital signal processor 570. In one configuration, the baseband Tx signal 542 may originate from the digital signal processor 570 (i.e., the digital signal processor 570 may generate the baseband Tx signal 542). The baseband Tx signal 542 may also be passed through a filter (e.g., a baseband filter (BBF) (not shown)). The output of the digital signal processor 570 may be referred to as the processed baseband Tx signal 522.

The processed baseband Tx signal 522 may be provided to the summer 566 and the least mean-squared (LMS) cancellers 554. The summer 566 may output a preconditioned baseband Tx signal 584. The preconditioned baseband Tx signal 584 may be filtered by the baseband filter (BBF) 524, up-converted by the up-converter 516, amplified by the power amplifier (PA) 512, filtered by the duplexer 508, and transmitted via the antenna 504.

The transmitter 526 may include a feedback loop 582 that includes the Tx interference canceller/power detector 520. The Tx interference canceller/power detector 520 may include a down-converter 550, an analog-to-digital converter (ADC) 578, the summer 566, least mean-squared (LMS) cancellers 554 and a power detector 562.

The feedback loop 582 may provide a reconstructed interference signal 556 to the summer 566 to cancel out Tx interference (e.g., noise and/or distortion) in the processed baseband Tx signal 522 that is produced by the transmitter 526. The feedback loop 582 may also provide a Tx power level 564 to the digital signal processor 570, which may be used in adjusting the Tx power level of the Tx output signal 510.

The Tx output signal 510 may be down-converted by the down-converter 550 to a baseband frequency to obtain a baseband feedback signal 552. The down-converter may be driven by a Tx local oscillator (LO) 518. The Tx local oscillator (LO) 518 may also drive the up-converter 516.

The baseband feedback signal 552 may be converted to a digital signal by the analog-to-digital converter (ADC) 578. The digital feedback signal may be provided to the least mean-squared (LMS) cancellers 554. The least mean-squared (LMS) cancellers 554 may also obtain the processed baseband Tx signal 522, which is in the digital domain.

In the digital domain, the least mean-squared (LMS) cancellers 554 may generate the reconstructed interference signal 556 and the weight 586. The weight 586 may include the gain between the baseband feedback signal 552 and the processed baseband Tx signal 522. The reconstructed interference signal 556 may include the Tx noise and distortion from the processed baseband Tx signal 522.

The least mean-squared (LMS) cancellers 554 may provide the reconstructed interference signal 556 to the summer 566. The summer 566 may subtract the reconstructed interference signal 556 from the processed baseband Tx signal 522 to cancel out the Tx noise and distortion in the processed baseband Tx signal 522 (thereby resulting in a preconditioned baseband Tx signal 584 with reduced/eliminated Tx noise and distortion).

The least mean-squared (LMS) cancellers 554 may also provide the weight 586 to the power detector 562. The power detector 562 may determine the Tx power level 564 based on the weight 586. The digital signal processor 570 may adjust the power of the transmit signal (e.g., the baseband Tx signal 542 or the Tx output signal 510) based on the Tx power level 564. For example, the digital signal processor 570 may direct the power amplifier (PA) 512 to reduce power amplification, conserving power usage of the wireless device 102.

By reusing common functions and information within the Tx interference canceller/power detector 520, the transmitter 526 and also the wireless communication device 102 may save die area and reduce power consumption. For example, the wireless device 102 may use only a single feedback receiver path to achieve Tx interference reduction (e.g., Tx noise and distortion) and Tx power detection, whereas current approaches require multiple feedback receivers to perform the same operations.

Figure 6:
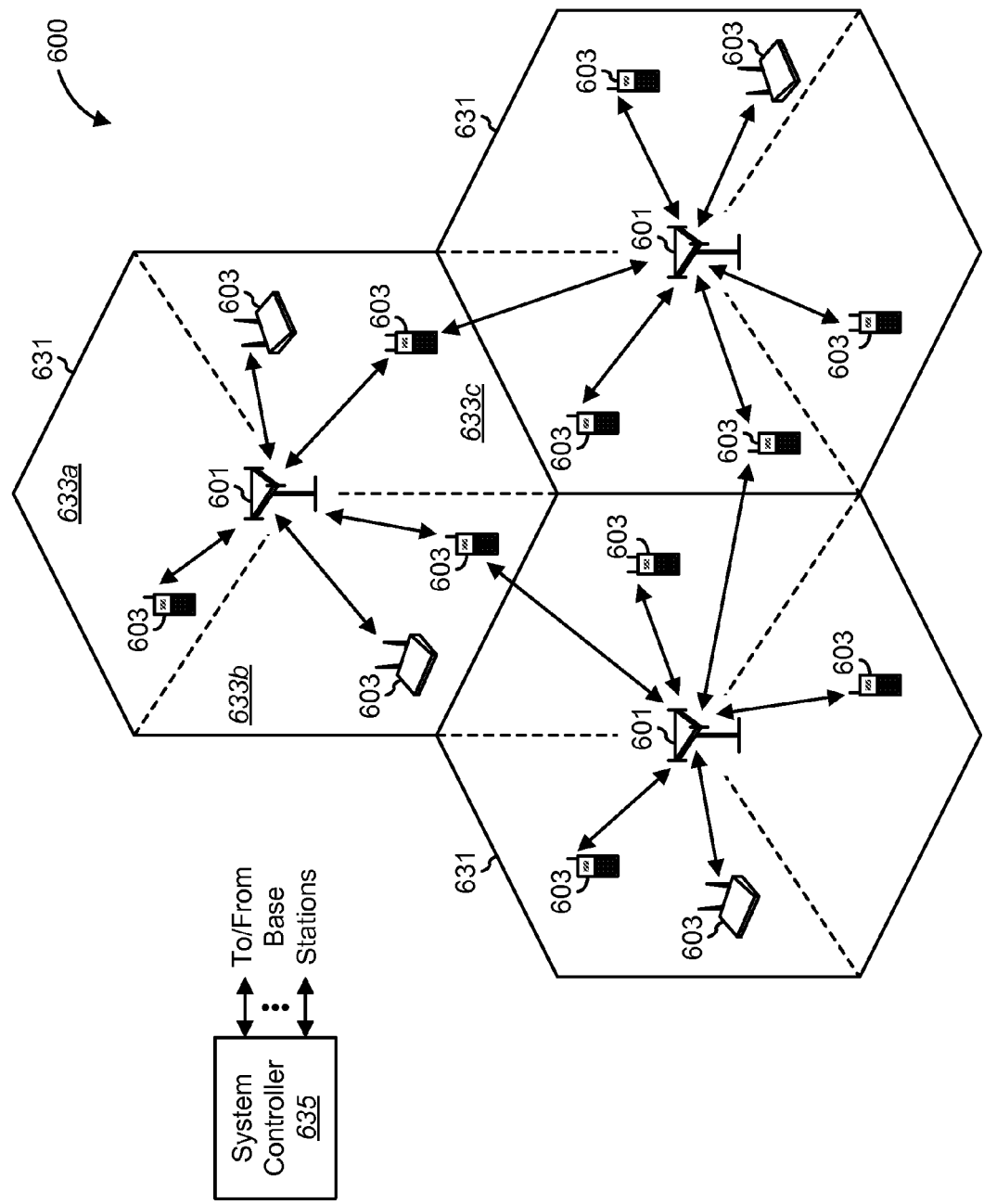
FIG. 6 shows an example of a wireless communication system in which the systems and methods disclosed herein may be utilized.

FIG. 6 shows an example of a wireless communication system 600 in which the systems and methods disclosed herein may be utilized. The wireless communication system 600 includes multiple base stations 601 and multiple wireless communication devices 603. Each base station 601 provides communication coverage for a particular geographic area 631. The term "cell" can refer to a base station 601 and/or its coverage area 631, depending on the context in which the term is used.

To improve system capacity, a base station coverage area 631 may be partitioned into plural smaller areas, e.g., three smaller areas 633a, 633b, and 633c. Each smaller area 633a, 633b and 633c may be served by a respective base transceiver station (BTS). The term "sector" can refer to a BTS and/or its coverage area 633, depending on the context in which the term is used. For a sectorized cell, the BTSs for all sectors of that cell are typically co-located within the base station 601 for the cell.

Wireless communication devices 603 are typically dispersed throughout the wireless communication system 600. A wireless communication device 603 may communicate with one or more base stations 601 on the downlink and/or uplink at any given moment. The downlink (or forward link) refers to the communication link from a base station 601 to a wireless communication device 603, and the uplink (or reverse link) refers to the communication link from a wireless communication device 603 to a base station 601. Uplink and downlink may refer to the communication link or to the carriers used for the communication link.

For a centralized architecture, a system controller 635 may couple to the base stations 601 and provide coordination and control for the base stations 601. The system controller 635 may be a single network entity or a collection of network entities. For a distributed architecture, base stations 601 may communicate with one another as needed.

Figure 7:
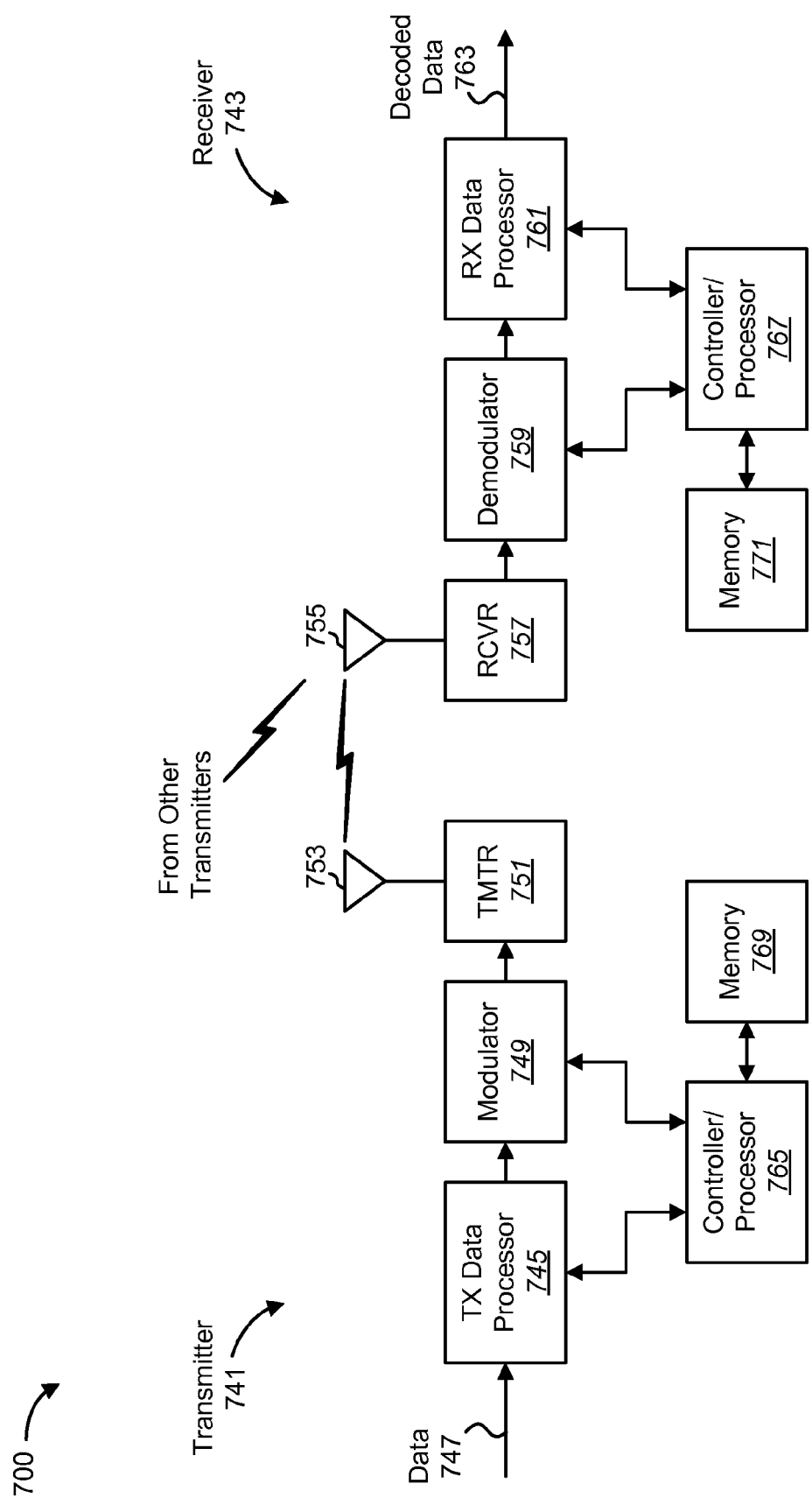
FIG. 7 shows a block diagram of a transmitter and a receiver in a wireless communication system.

FIG. 7 shows a block diagram of a transmitter 741 and a receiver 743 in a wireless communication system 700. For the downlink, the transmitter 741 may be part of a base station 701 and the receiver 743 may be part of a wireless communication device 703. For the uplink, the transmitter 741 may be part of a wireless communication device 703 and the receiver 743 may be part of a base station 701.

At the transmitter 741, a transmit (Tx) data processor 745 receives and processes (e.g., formats, encodes, and interleaves) data 747 and provides coded data. A modulator 749 performs modulation on the coded data and provides a modulated signal. The modulator 749 may perform Gaussian minimum shift keying (GMSK) for global system for mobile communications (GSM), 7-ary phase shift keying (7-PSK) for Enhanced Data rates for Global Evolution (EDGE), etc. GMSK is a continuous phase modulation protocol, whereas 7-PSK is a digital modulation protocol. A transmitter unit (TMTR) 751 conditions (e.g., filters, amplifies, and upconverts) the modulated signal and generates an RF-modulated signal, which is transmitted via an antenna 753.

At the receiver 743, an antenna 755 receives RF-modulated signals from the transmitter 741 and other transmitters. The antenna 755 provides a received RF signal to a receiver unit (RCVR) 757. The receiver unit 757 conditions (e.g., filters, amplifies, and downconverts) the received RF signal, digitizes the conditioned signal and provides samples. A demodulator 759 processes the samples as described below and provides demodulated data. A receive (Rx) data processor 761 processes (e.g., deinterleaves and decodes) the demodulated data and provides decoded data 763. In general, the processing by demodulator 759 and Rx data processor 761 is complementary to the processing by the modulator 749 and the Tx data processor 745, respectively, at the transmitter 741.

Controllers/processors 765 and 767 direct operation at the transmitter 741 and receiver 743, respectively. Memories 769 and 771 store program codes in the form of computer software and data used by the transmitter 741 and receiver 743, respectively.

Figure 8:
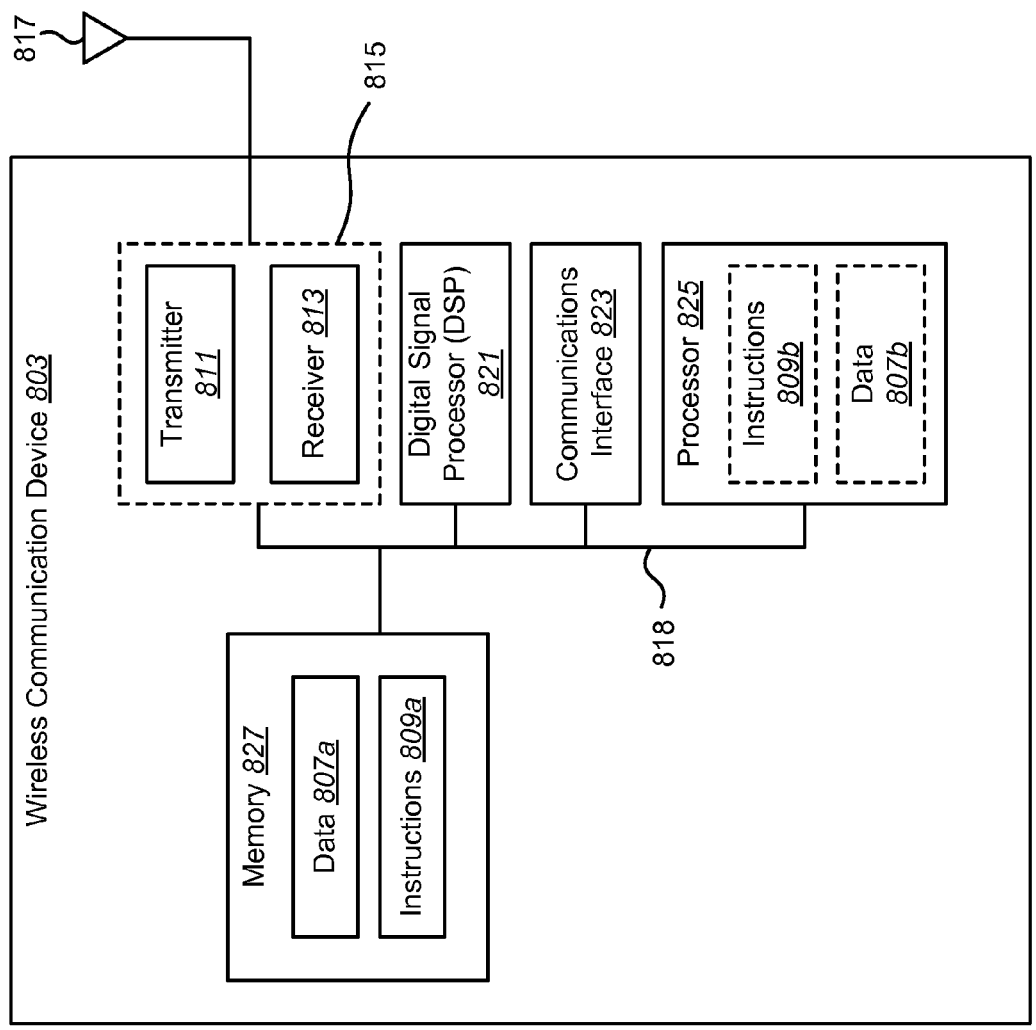
FIG. 8 illustrates certain components that may be included within a wireless communication device.

FIG. 8 illustrates certain components that may be included within a wireless communication device 803. The wireless communication device 803 may be an access terminal, a mobile station, a user equipment (UE), etc. The wireless communication device 803 includes a processor 825. The processor 825 may be a general purpose single- or multi-chip microprocessor (e.g., an ARM), a special purpose microprocessor (e.g., a digital signal processor (DSP)), a microcontroller, a programmable gate array, etc. The processor 825 may be referred to as a central processing unit (CPU). Although just a single processor 825 is shown in the wireless communication device 803 of FIG. 8, in an alternative configuration, a combination of processors (e.g., an ARM and DSP) could be used.

The wireless communication device 803 also includes memory 827. The memory 827 may be any electronic component capable of storing electronic information. The memory 827 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 807*a* and instructions 809*a* may be stored in the memory 827. The instructions 809*a* may be executable by the processor 825 to implement the methods disclosed herein. Executing the instructions 809*a* may involve the use of the data 807*a* that is stored in the memory 827. When the processor 825 executes the instructions 809, various portions of the instructions 809*b* may be loaded onto the processor 825, and various pieces of data 807*b* may be loaded onto the processor 825.

The wireless communication device 803 may also include a transmitter 811 and a receiver 813 to allow transmission and reception of signals to and from the wireless communication device 803 via an antenna 817. The transmitter 811 and receiver 813 may be collectively referred to as a transceiver 815. The wireless communication device 803 may also include (not shown) multiple transmitters, multiple antennas, multiple receivers and/or multiple transceivers.

The wireless communication device 803 may include a digital signal processor (DSP) 821. The wireless communication device 803 may also include a communications interface 823. The communications interface 823 may allow a user to interact with the wireless communication device 803.

The various components of the wireless communication device 803 may be coupled together by one or more buses, which may include a power bus, a control signal bus, a status signal bus, a data bus, etc. For the sake of clarity, the various buses are illustrated in FIG. 8 as a bus system 819.

Figure 9:
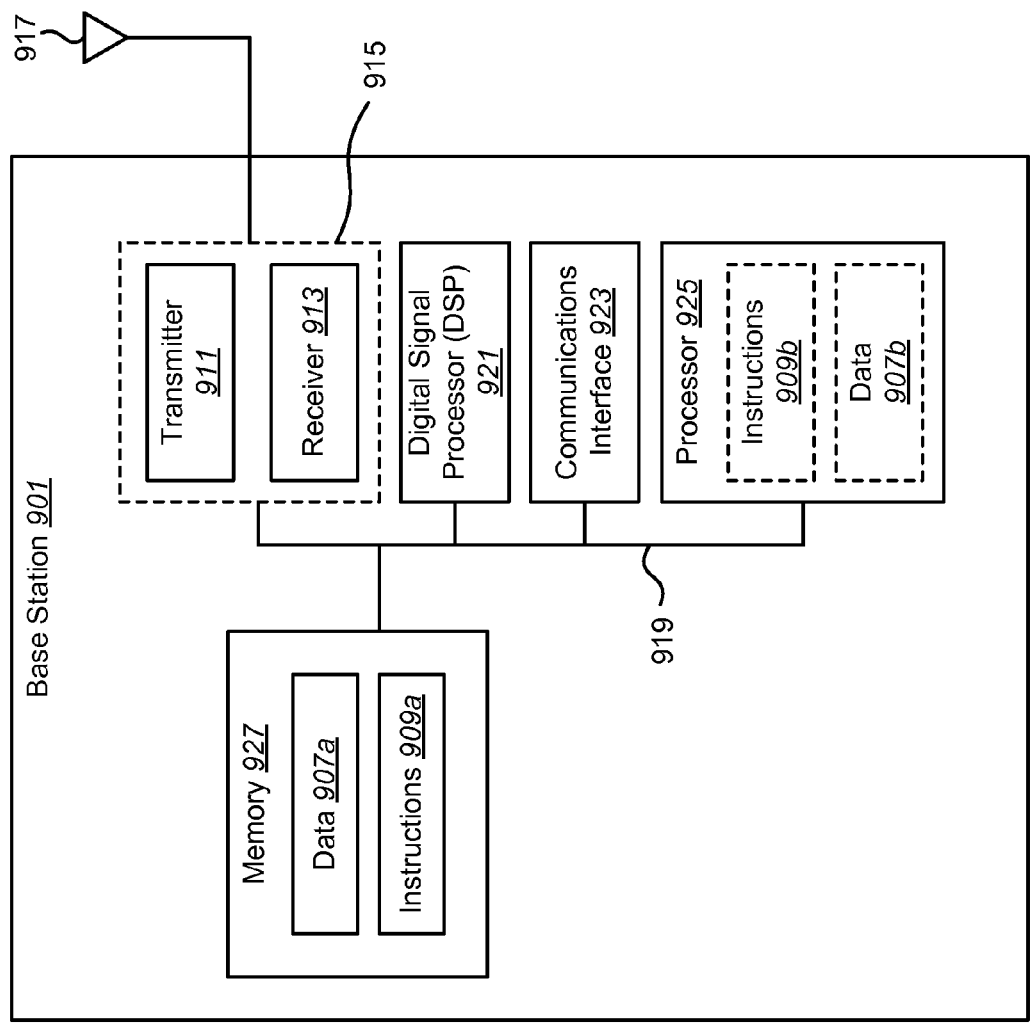
FIG. 9 illustrates certain components that may be included within a base station.

FIG. 9 illustrates certain components that may be included within a base station 901. A base station may also be referred to as, and may include some or all of the functionality of, an access point, a broadcast transmitter, a NodeB, an evolved NodeB, etc. The base station 901 includes a processor 925. The processor 925 may be a general purpose single- or multi-chip microprocessor (e.g., an ARM), a special purpose microprocessor (e.g., a digital signal processor (DSP)), a microcontroller, a programmable gate array, etc. The processor 925 may be referred to as a central processing unit (CPU). Although just a single processor 925 is shown in the base station 901 of FIG. 9, in an alternative configuration, a combination of processors (e.g., an ARM and DSP) could be used.

The base station 901 also includes memory 927. The memory 927 may be any electronic component capable of storing electronic information. The memory 927 may be embodied as random access memory (RAM), read only memory (ROM), magnetic disk storage media, optical storage media, flash memory devices in RAM, on-board memory included with the processor, EPROM memory, EEPROM memory, registers and so forth, including combinations thereof.

Data 907*a* and instructions 909*a* may be stored in the memory 927. The instructions 909*a* may be executable by the processor 925 to implement the methods disclosed herein. Executing the instructions 909*a* may involve the use of the data 907*a* that is stored in the memory 927. When the processor 925 executes the instructions 909*a*, various portions of the instructions 909*b* may be loaded onto the processor 925, and various pieces of data 907*b* may be loaded onto the processor 925.

The base station 901 may also include a transmitter 911 and a receiver 913 to allow transmission and reception of signals to and from the base station 901. The transmitter 911 and receiver 913 may be collectively referred to as a transceiver 915. An antenna 917 may be electrically coupled to the transceiver 915. The base station 901 may also include (not shown) multiple transmitters, multiple receivers, multiple transceivers and/or multiple antennas.

The base station 901 may include a digital signal processor (DSP) 921. The base station 901 may also include a communications interface 923. The communications interface 923 may allow a user to interact with the base station 901.

The various components of the base station 901 may be coupled together by one or more buses, which may include a power bus, a control signal bus, a status signal bus, a data bus, etc. For the sake of clarity, the various buses are illustrated in FIG. 9 as a bus system 919.

In the above description, reference numbers have sometimes been used in connection with various terms. Where a term is used in connection with a reference number, this is meant to refer to a specific element that is shown in one or more of the figures. Where a term is used without a reference number, this is meant to refer generally to the term without limitation to any particular figure.

The proposed transceiver 106 architecture may be used in wireless communication links, wired communication links, optical communication links, etc. Communications in a wireless communication system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO and MISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The $3^{rd}$ Generation Partnership Project (3GPP) is a collaboration between groups of telecommunications associations that aims to define a globally applicable third generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved global system for mobile communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) networks and adds high speed uplink packet access (HSUPA). Release 8 introduces dual downlink carriers and Release 9 extends dual carrier operation to uplink for UMTS.

CDMA2000 is a family of third generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1x or 1xRTT refers to the core CDMA2000 wireless air interface standard. 1x more specifically refers to 1 times Radio Transmission Technology and indicates the same radio frequency (RF) bandwidth as used in IS-95. 1xRTT adds 64 additional traffic channels to the forward link.

EV-DO refers to Evolution-Data Optimized. EV-DO is a telecommunications standard for the wireless transmission of data through radio signals.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation, and details of the systems, methods and apparatus described herein without departing from the scope of the claims.

What is claimed is:

1. A method for Tx interference cancellation and power detection in a wireless device, the method comprising:
    down-converting a portion of a Tx output signal to generate a feedback signal;
    generating a reconstructed interference signal and a weight based on the feedback signal;
    phase shifting the reconstructed interference signal based on the weight to produce an aligned reconstructed interference signal;
    detecting a Tx power level based on the weight; and
    subtracting the aligned reconstructed interference signal from a filtered baseband TX signal,
    wherein the feedback signal comprises a first baseband feedback signal and a second baseband feedback signal, and wherein generating the reconstructed interference signal and the weight based on the feedback signal comprises:
        receiving the first baseband feedback signal and the second baseband feedback signal in a first portion of a least mean-square cancellers and receiving a filtered baseband Tx Q signal and a filtered baseband Tx I signal in the first portion of the least mean-square cancellers, wherein the first portion of the least mean-square cancellers produces said weight comprising a first weight and a second weight;
        receiving the first weight and the second weight in a second portion of the least mean-square cancellers and receiving the filtered baseband Tx Q signal and the filtered baseband Tx I signal in the second portion of the least mean-square cancellers, wherein the second portion of the least mean-square cancellers produces a first desired Tx signal and a second desired Tx signal; and
        subtracting the first desired Tx signal from the first baseband feedback signal and subtracting the second desired Tx signal from the second baseband feedback signal to produce said reconstructed interference signal.

2. The method of claim 1, wherein generating the reconstructed interference signal and the weight, detecting the Tx power level, and subtracting the aligned reconstructed interface signal are performed in the digital domain.

3. The method of claim 1, wherein the portion of the Tx output signal is down-converted using a frequency from a Tx local oscillator.

4. The method of claim 1, further comprising amplifying the filtered baseband Tx signal using a driver amplifier coupled to a power amplifier to obtain the Tx output signal.

5. The method of claim 4, wherein the weight is based on signal gain between the baseband Tx signal and the Tx output signal.

6. The method of claim 1, wherein the first weight comprises a real weight component and the second weight comprises an imaginary weight component, and wherein the real weight component is $A \sin(\phi)/2$ and the imaginary weight component is $A \cos(\phi)/2$.

7. The method of claim 1, wherein detecting the Tx power level comprises adding together a squared first weight with a squared second weight to obtain the Tx power level.

8. The method of claim 1, wherein the Tx power level is detected using root mean square calculations on the weight.

9. The method of claim 1, wherein subtracting the aligned reconstructed interference signal from the filtered baseband Tx signal is prior to up-converting and amplifying the filtered baseband Tx signal.

10. The method of claim 1, further comprising adjusting an output power of the wireless device based on the Tx power level.

11. The method of claim 10, wherein adjusting the output power of the wireless device comprises adjusting amplification of a power amplifier.

12. The method of claim 10, wherein adjusting the output power comprises:
    matching the detected Tx power level to a look-up table; and
    obtaining the output power from the look-up table.

13. The method of claim 1, wherein the aligned reconstructed interference signal and the weight are generated reusing least mean-squared cancellers on the wireless device.

14. The method of claim 13, wherein the least mean-squared cancellers isolate a desired Tx signal of the feedback signal.

15. The method of claim 14, wherein the least mean-squared cancellers remove the desired Tx signal from the feedback signal, leaving only noise and interference in the reconstructed interference signal.

16. An apparatus for Tx interference cancellation and power detection, the apparatus comprising:
    a feedforward path configured to generate a Tx output signal from a filtered baseband Tx signal; and a feedback loop comprising:
a Tx interference canceller/power detector that generates a reconstructed interference signal and a weight from a feedback signal, that generates an aligned reconstructed interference signal based on the weight, and that detects a Tx power level based on the weight; and
a summer that subtracts the aligned reconstructed interference signal from the filtered baseband Tx signal,
wherein the feedback signal comprises a first baseband feedback signal and a second baseband feedback signal, and wherein Tx interference canceller/power detector:
receives the first baseband feedback signal and the second baseband feedback signal in a first portion of a least mean-square cancellers and receives a filtered baseband Tx Q signal and a filtered baseband Tx I signal in the first portion of the least mean-square cancellers, wherein the first portion of the least mean-square cancellers produces said weight comprising a first weight and a second weight;
receives the first weight and the second weight in a second portion of the least mean-square cancellers and receives the filtered baseband Tx Q signal and the filtered baseband Tx I signal in the second portion of the least mean-square cancellers, wherein the second portion of the least mean-square cancellers produces a first desired Tx signal and a second desired Tx signal; and
subtracts the first desired Tx signal from the first baseband feedback signal and subtracts the second desired Tx signal from the second baseband feedback signal to produce said reconstructed interference signal.

17. The apparatus of claim 16, wherein the Tx interference canceller/power detector and the summer operate in the digital domain.

18. The apparatus of claim 16, wherein a portion of the Tx output signal is used as the feedback signal.

19. The apparatus of claim 16, wherein the feedback signal is down-converted using a frequency from a Tx local oscillator.

20. The apparatus of claim 16, wherein the weight is based on signal gain between the filtered baseband Tx signal and the Tx output signal.

21. The apparatus of claim 16, wherein the first weight comprises a real weight component and the second weight comprises an imaginary weight component, and wherein the real weight component is $A \sin(\phi)/2$ and the imaginary weight component is $A \cos(\phi)/2$.

22. The apparatus of claim 16, wherein the Tx interference canceller/power detector detects the Tx power level by adding together a squared first weight with a squared second weight.

23. The apparatus of claim 16, wherein the Tx interference canceller/power detector detects the Tx power level by using root mean square calculations on the weight.

24. The apparatus of claim 16, further comprising a modem that receives the Tx power level, wherein the modem adjusts an output power of the wireless device based on the Tx power level.

25. The apparatus of claim 24, wherein the modem matches the detected Tx power level to a look-up table to determine the output power.

26. A computer-program product for Tx interference cancellation and power detection in a wireless device, the computer-program product comprising a non-transitory computer-readable medium having instructions thereon, the instructions comprising:
code for causing the wireless device to down-convert a portion of a Tx output signal to generate a feedback signal;
code for causing the wireless device to generate a reconstructed interference signal and a weight based on the feedback signal;
code for causing the wireless device to phase shift the reconstructed interference signal based on the weight to produce an aligned reconstructed interference signal;
code for causing the wireless device to detect a Tx power level based on the weight; and
code for causing the wireless device to subtract the aligned reconstructed interference signal from a filtered baseband TX signal,
wherein the feedback signal comprises a first baseband feedback signal and a second baseband feedback signal, and further comprising code for causing the wireless device to:
receive the first baseband feedback signal and the second baseband feedback signal in a first portion of a least mean-square cancellers and receive a filtered baseband Tx Q signal and a filtered baseband Tx I signal in the first portion of the least mean-square cancellers, wherein the first portion of the least mean-square cancellers produces said weight comprising a first weight and a second weight;
receive the first weight and the second weight in a second portion of the least mean-square cancellers and receive the filtered baseband Tx Q signal and the filtered baseband Tx I signal in the second portion of the least mean-square cancellers, wherein the second portion of the least mean-square cancellers produces a first desired Tx signal and a second desired Tx signal; and
subtract the first desired Tx signal from the first baseband feedback signal and subtracting the second desired Tx signal from the second baseband feedback signal to produce said reconstructed interference signal.

27. The computer-program product of claim 26, wherein the portion of the Tx output signal is down-converted using a frequency from a Tx local oscillator.

28. The computer-program product of claim 26, further comprising code for causing the wireless device to amplify the filtered baseband Tx signal using a power amplifier to obtain the Tx output signal.

29. The computer-program product of claim 26, wherein the weight is based on signal gain between the filtered baseband Tx signal and the Tx output signal.

30. The computer-program product of claim 26, wherein the first weight comprises a real weight component and the second weight comprises an imaginary weight component, and wherein the real weight component is $A \sin(\phi)/2$ and the imaginary weight component is $A \cos(\phi)/2$.

31. The computer-program product of claim 26, wherein the code for causing the wireless device to detect the Tx power level comprises code for causing the wireless device to add together a squared first weight with a squared second weight to obtain the Tx power level.

32. The computer-program product of claim 26, wherein the Tx power level is detected using root mean square calculations on the weight.

33. The computer-program product of claim 26, further comprising code for causing the wireless device to adjust an output power of the wireless device based on the Tx power level.

34. The computer-program product of claim 33, wherein the code for causing the wireless device to adjust the output power of the wireless device comprises code for causing the wireless device to adjust amplification of a power amplifier.

35. The computer-program product of claim 33, wherein the code for causing the wireless device to adjust the output power comprises:
code for causing the wireless device to match the detected Tx power level to a look-up table; and
code for causing the wireless device to obtain the output power from the look-up table.

36. The computer-program product of claim 26, wherein the reconstructed interference signal and the weight are generated reusing least mean-squared cancellers on the wireless device.

37. The computer-program product of claim 36, wherein the least mean-squared cancellers isolate a desired Tx signal of the feedback signal.

38. The computer-program product of claim 37, wherein the least mean-squared cancellers remove the desired Tx signal from the feedback signal, leaving only noise and interference in the reconstructed interference signal.

39. A wireless device for Tx interference cancellation and power detection, comprising:
means for down-converting a portion of a Tx output signal to generate a feedback signal;
means for generating a reconstructed interference signal and a weight based on the feedback signal;
means for phase shifting the reconstructed interference signal based on the weight to produce an aligned reconstructed interference signal;
means for detecting a Tx power level based on the weight; and
means for subtracting the aligned reconstructed interference signal from a filtered baseband TX signal,
wherein the feedback signal comprises a first baseband feedback signal and a second baseband feedback signal, and further comprising:
means for receiving the first baseband feedback signal and the second baseband feedback signal in a first portion of a least mean-square cancellers and receiving a filtered baseband Tx Q signal and a filtered baseband Tx I signal in the first portion of the least mean-square cancellers, wherein the first portion of the least mean-square cancellers produces said weight comprising a first weight and a second weight;
means for receiving the first weight and the second weight in a second portion of the least mean-square cancellers and receiving the filtered baseband Tx Q signal and the filtered baseband Tx I signal in the second portion of the least mean-square cancellers, wherein the second portion of the least mean-square cancellers produces a first desired Tx signal and a second desired Tx signal; and
means for subtracting the first desired Tx signal from the first baseband feedback signal and subtracting the second desired Tx signal from the second baseband feedback signal to produce said reconstructed interference signal.

40. The wireless device of claim 39, wherein the weight is based on signal gain between the baseband Tx signal and the Tx output signal.

41. The wireless device of claim 39, wherein the means for detecting the Tx power level comprise means for adding together a squared first weight with a squared second weight to obtain the Tx power level.

42. The wireless device of claim 39, wherein the Tx power level is detected using root mean square calculations on the weight.

43. The wireless device of claim 39, wherein the means for subtracting the aligned reconstructed interference signal from the filtered baseband Tx signal is prior to up-converting and amplifying the filtered baseband Tx signal.

44. The wireless device of claim 39, further comprising means for adjusting an output power of the wireless device based on the Tx power level.

45. The wireless device of claim 39, wherein the reconstructed interference signal and the weight are generated reusing least mean-squared cancellers on the wireless device.

46. The wireless device of claim 45, wherein the least mean-squared cancellers isolate a desired Tx signal of the feedback signal.

47. The wireless device of claim 46, wherein the least mean-squared cancellers remove the desired Tx signal from the feedback signal, leaving only noise and interference in the reconstructed interference signal.

* * * * *